(12) United States Patent
Thiria et al.

(10) Patent No.: US 11,999,852 B2
(45) Date of Patent: Jun. 4, 2024

(54) USE OF ARYL GROUP CONTAINING ORGANOPOLYSILOXANE GUMS AS ADDITIVES TO INCREASE RHEOLOGICAL BEHAVIOR

(71) Applicant: Elkem Silicones USA Corp., East Brunswick, NJ (US)

(72) Inventors: Remi Thiria, Fort Mill, SC (US); Daniel Hess, Fort Mill, SC (US)

(73) Assignee: Elkem Silicones USA Corp.

( * ) Notice: Subject to any disclaimer, the term of this patent is extended or adjusted under 35 U.S.C. 154(b) by 0 days.

(21) Appl. No.: 18/190,392

(22) Filed: Mar. 27, 2023

(65) Prior Publication Data

US 2023/0250285 A1 Aug. 10, 2023

Related U.S. Application Data

(62) Division of application No. 17/228,919, filed on Apr. 13, 2021, now Pat. No. 11,643,555.

(60) Provisional application No. 63/010,510, filed on Apr. 15, 2020.

(51) Int. Cl.
| | |
|---|---|
| *C08L 83/04* | (2006.01) |
| *B33Y 10/00* | (2015.01) |
| *B33Y 70/00* | (2020.01) |
| *B29C 64/112* | (2017.01) |
| *B29K 83/00* | (2006.01) |

(52) U.S. Cl.
CPC ............ *C08L 83/04* (2013.01); *B33Y 70/00* (2014.12); *B29C 64/112* (2017.08); *B29K 2083/00* (2013.01); *B33Y 10/00* (2014.12); *C08L 2205/025* (2013.01); *C08L 2205/035* (2013.01)

(58) Field of Classification Search
CPC combination set(s) only.
See application file for complete search history.

(56) References Cited

U.S. PATENT DOCUMENTS

| | | | |
|---|---|---|---|
| 5,036,131 A | 7/1991 | Himstedt et al. | |
| 5,082,735 A * | 1/1992 | Revis | C08G 77/388 428/452 |
| 5,091,445 A * | 2/1992 | Revis | C08G 77/38 524/789 |

(Continued)

FOREIGN PATENT DOCUMENTS

| | | |
|---|---|---|
| CN | 110128833 A1 | 8/2019 |
| WO | 2017/081028 A1 | 5/2017 |
| WO | 2017/121733 A1 | 7/2017 |

OTHER PUBLICATIONS

Cao Yunlai, "Sealant: Technology, Formula, Application", Chemical Industry Press, Aug. 2001, 1st Edition, p. 110—English machine translation.

(Continued)

*Primary Examiner* — Peter A Salamon
(74) *Attorney, Agent, or Firm* — McBee Moore & Vanik IP, LLC

(57) ABSTRACT

Curable silicone compositions comprising an aryl group-containing organopolysiloxane gum having a consistency of 200 to 900 as a rheological modifier are provided. Use of the curable silicone compositions comprising an aryl group-containing organopolysiloxane gum having a consistency of 200 to 900 in methods for additive manufacturing a three-dimensional silicone elastomer article are further provided.

19 Claims, 6 Drawing Sheets

(56) References Cited

U.S. PATENT DOCUMENTS

| | | | |
|---|---|---|---|
| 5,932,060 A * | 8/1999 | O'Brien | B32B 7/06 428/447 |
| 2019/0040204 A1 | 2/2019 | Beyer et al. | |
| 2019/0270240 A1 | 9/2019 | Wolf et al. | |
| 2021/0002482 A1 | 1/2021 | Thiria et al. | |
| 2021/0246312 A1 | 8/2021 | Thiria et al. | |
| 2021/0324194 A1 | 10/2021 | Thiria et al. | |

OTHER PUBLICATIONS

Zhao Xin, "Application of Nuclear Magnetic Resonance in Polymer Radiation Chemistry", China Railway Publishing House, May 2012, 1st Edition, p. 5—English machine translation.
Peng Zhihan et al., "Polyamide", Chemical Industry Press, Dec. 2001, 1st Edition, p. 154—English machine translation.
International Search Report of International Patent Application No. PCT/US2021/027345 dated Jul. 26, 2021.

\* cited by examiner

USE OF ARYL GROUP CONTAINING ORGANOPOLYSILOXANE GUMS AS ADDITIVES TO INCREASE RHEOLOGICAL BEHAVIOR

CROSS-REFERENCE TO RELATED APPLICATIONS

This patent application is a divisional of U.S. patent application Ser. No. 17/228,919, filed 13 Apr. 2021, which claims the benefit of U.S. Provisional Patent Application No. 63/010,510, filed on 15 Apr. 2020, the contents of each of which are hereby incorporated by reference in their entireties.

FIELD OF THE INVENTION

The present invention relates to curable silicone compositions and their use in methods for additive manufacturing a three-dimensional silicone elastomer article.

BACKGROUND OF THE INVENTION

Selecting materials for additive manufacturing, more particularly for extrusion printing, requires the consideration of their rheological properties, since these properties dictate extrusion pressure, post-extrusion shape retention, and printing resolution. Rheological behavior as shear thinning, or more particularly yield stress character, of viscoelastic materials is well known to be the key parameter to successfully use three-dimensional (3D) deposition technology. Thus, if yield stress reaches a sufficiently high value, the shape of printed object is held during and after deposition, but also during post-printing polymerization process.

A shear-thinning characteristic is particularly desirable for extrusion, allowing for lowered viscosity under the high shear rates involved in extrusion and a higher viscosity post-extrusion for shape retention. Shear thinning is usually achieved through the addition of a rheological modifier, of which many are commercially available.

To provide an additive manufacturing method for the production of parts 3D printed with siloxane-based elastomeric compositions, WO 2017/081028 and WO 2017/121733 disclose the use of rheological agents which contain polar groups and are selected from an epoxy group, polyether group or polyester group-functional compounds. Additional rheological modifiers such as caprolactone, hydroxycaproic acid, and polycarbonate polyols have also been mentioned.

U.S. Pat. No. 5,036,131 discloses a silicone dispersion, having improved toughness and thixotropic characteristics, that cures to an elastomer upon exposure to the air. The silicone dispersion used therein is based on a hydroxyl end-blocked polydiorganosiloxane, aluminum trihydrate and moisture-activated curing system. In order to obtain the thixotropic nature of the coating, it is required to include in the silicone dispersion the siloxane (2) having hydroxyl end-blocking and phenyl or 3,3,3-trifluoropropyl radicals in combination with the untreated fumed silica.

There remains a need to improve both yield stress and mechanical properties of 3D printable silicone elastomer compositions.

BRIEF SUMMARY OF THE INVENTION

As a result of diligent research, the inventors of the present invention found that it was possible to solve the above-mentioned problems by using aryl-group containing organopolysiloxane gums having a consistency of 200 to 900 as a rheological modifier.

A method for additive manufacturing a silicone elastomer article is provided comprising the steps of:
1) printing a first curable silicone composition on a substrate with a 3D printer selected from an extrusion 3D printer or a material jetting 3D printer to form a first layer;
2) printing a second curable silicone composition on the first or previous layer with the said 3D printer to form a subsequent layer;
3) optionally repeating step 2) with independently selected curable silicone composition for any additional layer needed; and
4) allowing the first and subsequent layers to crosslink, optionally by heating, to obtain a cured silicone elastomer article;

where at least one layer of said curable silicone composition is a curable silicone composition X comprising:
(A) a silicone base comprising organosilicon components which cure respectively via addition-curing, condensation-curing or peroxide-curing reaction;
(D) a curing agent able to cure the silicone base which is respectively an addition catalyst, a condensation catalyst or a peroxide curing compound;
(C) at least one organopolysiloxane gum C having a consistency of between 200 and 900 at 25° C., containing at least one silicon-bonded $C_6$ to $C_{12}$ aryl groups per molecule and containing at least one functional group per molecule chosen from the group consisting of: a silicon-bonded $C_2$ to $C_{20}$ alkenyl group, a silicon-bonded hydrogen atom, a silicon-bonded hydroxyl group, a silicon-bonded alkoxy group, a silicon-bonded oxime group, a silicon-bonded amino group, a silicon-bonded amido group, a silicon-bonded aminoxy group, a silicon-bonded acyloxy group, a silicon-bonded ketiminoxy group and a silicon-bonded enoxy group; and
(E) at least one filler E.

In some embodiments, a method for additive manufacturing a silicone elastomer article is provided in which the curable silicone composition X is an addition-curable liquid silicone composition X, wherein said addition-curable liquid silicone composition X comprises:
(A) at least one organopolysiloxane A having at least two silicon-bonded $C_2$ to $C_{20}$ alkenyl groups per molecule,
(B) at least one organosilicon crosslinker B containing at least two silicon-bonded hydrogen atoms per molecule,
(C) at least one organopolysiloxane gum C having a consistency of between 200 and 900 at 25° C. and containing at least one silicon-bonded $C_2$ to $C_{20}$ alkenyl group per molecule and at least one silicon-bonded $C_6$ to $C_{12}$ aryl groups per molecule,
(D) at least one addition reaction catalyst D,
(E) at least one I filler E,
(F) optionally, at least one diorganohydrogensiloxy-terminated diorganopolysiloxane chain extender F,
(G) optionally, at least one cure rate modifier G,
(H) optionally, at least one silicone resin H, and
(I) optionally, at least one additive I.

In some embodiments, a method for additive manufacturing a silicone elastomer article is provided in which the 3D printer is an extrusion 3D printer.

A silicone elastomer article produced by the methods of the invention is also provided.

Also provided are addition-curable liquid silicone compositions X for additive manufacturing a silicone elastomer article, in which said addition-curable liquid silicone composition X comprises:

(A) at least one organopolysiloxane A having at least two silicon-bonded $C_2$ to $C_{20}$ alkenyl groups per molecule, (B) at least one organosilicon crosslinker B containing at least two silicon-bonded hydrogen atoms per molecule, (C) at least one organopolysiloxane gum C having a consistency of between 200 and 900 at 25° C. and containing at least one silicon-bonded $C_2$ to $C_{20}$ alkenyl group per molecule and at least one silicon-bonded $C_6$ to $C_{12}$ aryl groups per molecule, (D) at least one addition reaction catalyst D, (E) at least one filler E, (F) optionally, at least one diorganohydrogensiloxy-terminated diorganopolysiloxane chain extender F, (G) optionally, at least one cure rate modifier G, (H) optionally, at least one silicone resin H, and (I) optionally, at least one additive I.

In some embodiments, the at least one organopolysiloxane A having at least two silicon-bonded $C_2$ to $C_{20}$ alkenyl groups per molecule is of the following formula (1):

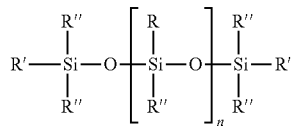

(1)

in which:
n is an integer ranging from 1 to 1000,

R is independently selected from a $C_1$ to $C_{20}$ alkyl group such as a methyl, ethyl, propyl, or a $C_6$ to $C_{12}$ aryl group such as a xylyl, tolyl, or phenyl group, or is a $C_2$ to $C_{20}$ alkenyl group, such as a vinyl, allyl, hexenyl, decenyl, or tetradecenyl group, preferably a methyl group, R' is independently selected from a $C_2$ to $C_{20}$ alkenyl group such as a vinyl, allyl, hexenyl, decenyl, or tetradecenyl group, preferably a vinyl group, and R" is independently selected from a $C_1$ to $C_{20}$ alkyl group such as a methyl, ethyl, propyl, or a $C_6$ to $C_{12}$ aryl group such as a xylyl, tolyl, or phenyl group, preferably a methyl group.

In some embodiments, the at least one organosilicon crosslinker B containing at least two silicon-bonded hydrogen atoms per molecule comprises:

(i) at least two, and preferably from 3 to 60, siloxy units of formula (XL-1), which may be identical or different:

 (XL-1)

wherein:
the symbol H represents a hydrogen atom,
the symbol Z represents an alkyl having from 1 to 8 carbon atoms inclusive, and
the symbol e is equal to 0, 1 or 2; and (ii) at least one, preferably from 1 to 550, more preferably from 1 to 250, of siloxy unit(s) of formula (XL-2):

 (XL-2)

wherein:
the symbol Z represents an alkyl having from 1 to 8 carbon atoms inclusive, or a $C_6$-$C_{12}$ aryl group such as a xylyl, tolyl, or phenyl group, and
the symbol g is equal to 0, 1, 2 or 3;
wherein Z in XL-1 and XL-2 can be the same or different.

In some embodiments, the at least one organopolysiloxane gum C containing at least one silicon-bonded $C_2$ to $C_{20}$ alkenyl groups per molecule and at least one silicon-bonded $C_6$ to $C_{12}$ aryl groups per molecule comprises:
at least one siloxy unit of formula (A-3):

 (A-3)

wherein the symbol "Alk" represents a $C_2$ to $C_{20}$ alkenyl group, such as a vinyl, allyl, hexenyl, decenyl, or tetradecenyl group, preferably a vinyl group, and the symbol R represents a $C_1$ to $C_{20}$ alkyl group, such as a methyl, ethyl, propyl, or a $C_6$-$C_{12}$ aryl group such as a xylyl, tolyl, or phenyl group, in which each instance of "Alk" and R can be the same or different, and
wherein h=1 or 2, and
at least one siloxy unit of formula (A-4):

 (A-4)

wherein the symbol "Ar" represents a $C_6$-$C_{12}$ aryl group optionally substituted by a $C_2$-$C_{20}$ alkylene group, such as a xylyl, tolyl, xylene, or phenyl group, or a $C_1$-$C_{20}$ aralkyl optionally substituted by a $C_2$-$C_{20}$ alkylene group, or a naphthyl group optionally substituted by a $C_1$-$C_{20}$ alkyl group and/or a $C_2$-$C_{20}$ alkylene group, or an anthracenyl group optionally substituted by a $C_1$-$C_{20}$ alkyl group and/or a $C_2$-$C_{20}$ alkylene group, preferably a phenyl group, and the symbol $R^1$ represents a $C_1$ to $C_{20}$ alkyl group, such as a methyl, ethyl, or propyl group, or a $C_2$ to $C_{20}$ alkenyl group, such as a vinyl, allyl, hexenyl, decenyl, or tetradecenyl group, in which each instance of "Ar" and $R^1$ can be the same or different, and
wherein h=0, 1, or 2,
wherein k=1 or 2, and wherein h+k=1, 2, or 3;
other siloxy units of formula (A-2):

 (A-2)

in which the symbol L represents a $C_1$ to $C_{20}$ alkyl group, such as a methyl, ethyl, propyl, and the symbol g is equal to 0, 1, 2, or 3, in which each instance of L can be the same or different.

In some embodiments, the at least one organopolysiloxane gum C is a diphenylsiloxane-dimethylsiloxane-vinylmethylsiloxane copolymer gum.

In some embodiments, the at least one organopolysiloxane gum C is vinyl-terminated.

In some embodiments, the at least one organopolysiloxane gum C comprises less than 30 mole % of aryl groups. For example, the at least one organopolysiloxane gum C may comprise from about 10 mole % to about 20 mole % of aryl groups.

In some embodiments, the catalyst D is a platinum group metal-containing catalyst.

In some embodiments, the at least one filler E is fumed silica treated using at least one compatibilization agent in the presence of at least one portion of the at least one alkenyl group-containing organopolysiloxane A.

Uses of an addition-curable liquid silicone composition X with a 3D printer, such as an extrusion 3D printer or a material jetting 3D printer, are also provided.

BRIEF DESCRIPTION OF THE DRAWINGS

FIG. 1A is a photograph of a 3D printed comparative silicone elastomer that does not comprise any organopolysiloxane gum. FIGS. 1B-1F show the effect of decreasing amounts of aryl group-containing organopolysiloxane gum within the curable liquid silicone composition on 3D printability. FIGS. 1B-1F are photographs of 3D printed silicone elastomers comprising 20% (FIG. 1B), 15% (FIG. 1C), 10% (FIG. 1D), 5% (FIG. 1E), and 0% (FIG. 1F) aryl group-containing organopolysiloxane gum.

FIG. 5A is a photograph of a 3D printed comparative silicone elastomer comprising aryl group-containing, low viscosity organopolysiloxane oil. FIGS. 5B and 5C are photographs of exemplary 3D printed silicone elastomers comprising aryl group-containing organopolysiloxane gum.

DETAILED DESCRIPTION OF THE INVENTION

Figure 1A:
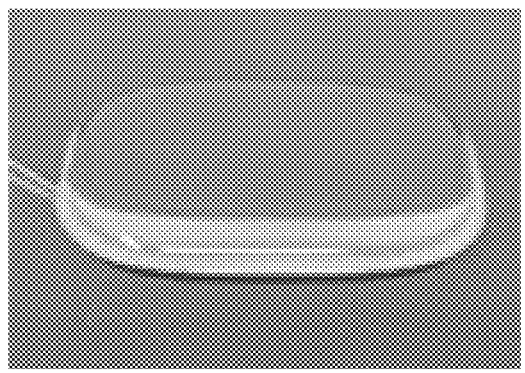
FIGS. 1A-1F provide representative photographs of 3D printed silicone elastomers.

Before the subject disclosure is further described, it is to be understood that the disclosure is not limited to the particular embodiments of the disclosure described below, as variations of the particular embodiments may be made and still fall within the scope of the appended claims. It is also to be understood that the terminology employed is for the purpose of describing particular embodiments, and is not intended to be limiting. Instead, the scope of the present disclosure will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this disclosure belongs.

As used herein, the term "silicone rubber" includes the crosslinked product of any crosslinkable silicone composition. The terms "silicone rubber" and "silicone elastomer" may be used interchangeably.

As used herein, the terms "crosslinked" and "cured" may be used interchangeably and refer to the reaction that occurs when the components of the curable silicone composition are combined and allowed to react, resulting in the cured silicone elastomer.

As used herein, the term "alkenyl" is understood to mean an unsaturated, linear or branched hydrocarbon chain, substituted or not, having at least one olefinic double bond, and more preferably a single double bond. Preferably, the "alkenyl" group has 2 to 10 carbon atoms and more preferably 2 to 6. This hydrocarbon chain optionally includes at least one heteroatom such as O, N, S. Preferred examples of "alkenyl" groups are vinyl, allyl and homoallyl groups, vinyl being particularly preferred.

As used herein, "alkyl" denotes a saturated, linear or branched hydrocarbon chain, possibly substituted (e.g. with one or more alkyls), with preferably 1 to 10 carbon atoms, for example 1 to 8 carbon atoms and better still 1 to 4 carbon atoms. Examples of alkyl groups are notably methyl, ethyl, isopropyl, n-propyl, tert-butyl, isobutyl, n-butyl, n-pentyl, isoamyl and 1,1-dimethylpropyl.

As used herein, "aryl" denotes an aryl group having 6 to 12 carbon atoms, which may optionally be substituted by alkyl having 1 to 30 carbon atoms.

In one aspect, the present invention is a method for additive manufacturing a silicone elastomer article comprising the steps of:

1) printing a first curable silicone composition on a substrate with a 3D printer selected from an extrusion 3D printer or a material jetting 3D printer to form a first layer;

2) printing a second curable silicone composition on the first or previous layer with the said 3D printer to form a subsequent layer;

3) optionally repeating step 2) with independently selected curable silicone composition for any additional layer needed; and 4) allowing the first and subsequent layers to crosslink, optionally by heating, to obtain a cured silicone elastomer article;

wherein at least one layer of said curable silicone composition is a curable silicone composition X, wherein said curable silicone composition X comprises:

(A) a silicone base comprising organosilicon components which cure respectively via addition-curing, condensation-curing or peroxide-curing reaction;

(D) a curing agent able to cure the silicone base which is respectively an addition catalyst, a condensation catalyst or a peroxide curing compound;

(C) at least one organopolysiloxane gum C having a consistency of between 200 and 900 at 25° C., containing at least one silicon-bonded $C_6$ to $C_{12}$ aryl groups per molecule and containing at least one functional group per molecule chosen from the group consisting of: a silicon-bonded $C_2$ to $C_{20}$ alkenyl group, a silicon-bonded hydrogen atom, a silicon-bonded hydroxyl group, a silicon-bonded alkoxy group, a silicon-bonded oxime group, a silicon-bonded amino group, a silicon-bonded amido group, a silicon-bonded aminoxy group, a silicon-bonded acyloxy group, a silicon-bonded ketiminoxy group and a silicon-bonded enoxy group; and (E) at least one filler E.

The inventors have surprisingly found that use of curable silicone compositions X as defined herein provides an efficient additive manufacturing method for the production of 3D-printed parts. In particular, use of the curable silicone compositions X of the invention in 3D printing applications provide the following benefits:

- allows for lowered viscosity under high shear rates involved in extrusion and a higher viscosity post-extrusion for shape retention,
- provides a stable composition which rheology does not evolve over the time (no thixotropic effect built up due to hydrogen bonds created between polar additives and silica surface),
- provides the ability to not change the input 3D process parameters whatever the age of the composition,
- allows for the 3D printing of silicone elastomer parts with an excellent accuracy without collapse or deformation of the layers at room temperature before curing,
- yields 3D elastomer parts with improved mechanical properties especially in the high durometer range.

Curable silicone compositions are well known in the art and include silicone compositions which cure through 3 types of reactions which are peroxide-curing, addition-curing or condensation-curing reaction.

In a preferred embodiment, the choice of the functional group of the organopolysiloxane gum C could be done as follows:

silicon-bonded $C_2$ to $C_{20}$ alkenyl groups and silicon-bonded hydrogen atom are preferably chosen for compositions which cure through addition-curing, silicon-bonded $C_2$ to $C_{20}$ alkenyl groups are preferably chosen for compositions which cure through peroxide-curing, and silicon-bonded hydroxyl groups, silicon-bonded alkoxy groups, silicon-bonded oxime groups, silicon-bonded amino groups, silicon-bonded amido groups, silicon-bonded aminoxy groups, silicon-bonded acyloxy groups, silicon-bonded ketiminoxy groups and silicon-bonded enoxy groups are preferably chosen for compositions which cure through condensation-curing reaction.

Curable silicone compositions are classified according to curing methods used, curing temperature conditions and consistency or viscosity of the curable silicone compositions as listed below:

HCR (High Consistency Silicone Rubbers) are heat-curable silicone compositions (or HTV which is an acronym for High Temperature Vulcanizing silicone compositions) for which their components cure via addition-curing or peroxide-curing reaction. They are prepared from reactive silicone gums with high molecular weight macromolecules containing various reactive groups.

LSR (Liquid Silicone Rubbers) are heat-curable silicone compositions (or High Temperature Vulcanizing, HTV) which use addition-curing catalysts and are sold as two-component systems. The primary differentiator between liquid silicone rubber (LSR) and high consistency rubber (HCR) is the "flowable" or "liquid" nature of LSR materials.

RTV (Room Temperature Vulcanizing) are curable silicone compositions which use either addition-curing catalysts or condensation-curing catalysts. They are sold as single or 2-component systems that cure from room temperature for those using condensation-curing catalyst to up to 200° C. for those using addition-curing catalysts.

Curable compositions which cure via peroxide-curing are achieved using organic peroxides which decompose at elevated temperature to form highly peroxo-reactive radicals which react with a silicone polymer containing alkenyl (such as vinyl) or alkyl groups. The organic peroxides used for curing are classified in alkenyl group specific peroxides (I) and alkenyl group non-specific peroxides (II). The first class is not able to crosslink polydimethylsiloxane (PDMS) which has no alkenyl groups, while the second one is able to crosslink every type of PDMS. The following groups of peroxides are available:

alkenyl group specific peroxides: diaroylperoxide, alkenyl group non-specific peroxides: dialkyl peroxide, diaralkylperoxide), alkylaroyl- and alkylaylperoxide, or mixtures of different groups.

Useful peroxides are di(2,4-dichlorobenzoyl) peroxide, which belongs to the group of diaroylperoxides. dicumylperoxide, 2,5-dimethyl-2,5-di-t-butylperoxyhexane and bis(dichlorobenzoyl)peroxide.

Curable compositions which cure via condensation-curing reaction refers to a curable silicone composition where curing is achieved through the reaction between a silanol group (Si—OH) of a siloxane polymer or a silane and/or hydrolysable Si—X groups (X is a hydrolyzable group) in the presence of moisture, leading to the formation of a siloxane (Si—O—Si) linkages and hydrogen gas or water. Typically, condensation-cure silicone systems have been cured with organotin compounds and/or titanates. Other catalysts are sometimes mentioned, such as catalysts based on zinc, zirconium, aluminum or amines such as guanidine derivatives. Classically, these formulations contain a hydroxyl-terminated silicone oil, for example an α,ω-(hydroxydimethylsilyl)-polydimethylsiloxane, optionally pre-functionalized with a silane so that it has hydrolyzable and condensable ends, a crosslinking agent, a polycondensation catalyst, classically a tin salt or an alkyl titanate, and optionally various fillers and additives depending on the intended final application.

These silicone compositions that harden by polymerization and/or crosslinking at ambient temperature (which can vary between 5° and 30° C. depending on the region) are familiar to a person skilled in the art and are classified in two separate groups:

compositions packaged as a "single-component" composition (RTV-1), which is are in the form of a single part (or component) in airtight packaging, and compositions packaged as a "two-component" composition (RTV-2), which are in the form of two separate parts (hence the designation "two-component") and whose packaging containing the catalyst is airtight.

The purpose of the airtight packaging is to prevent the silicone compositions containing the catalyst from coming into contact with atmospheric moisture during storage before use. During curing, which takes place by polymerization and/or crosslinking of these silicone compositions, water is supplied by atmospheric moisture in the case of the RTV-1 compositions. In the case of the RTV-2 compositions, dimethyltin dicarboxylates are commonly used as catalysts, but they may require the addition of some water to one of the parts in order to activate the catalyst and enable the polycondensation reaction when the contents of the two parts are mixed with ambient air so as to form the elastomer network, which leads to curing of the composition.

For example, the single-component silicone compositions (RTV-1) used as mastics or adhesives undergo cold crosslinking by a mechanism involving two main reactions, which may be successive or simultaneous:

1. A functionalization reaction, resulting from bringing a silicone oil having silanol functions, for example a hydroxyl-terminated silicone oil, such as an α,ω-(hydroxydimethylsilyl)-polydimethylsiloxane, into contact with a crosslinking agent, such as a silane of the type $SiX_4$ (for example a silicate) or a compound having the following function —$SiX_3$ with X most often being an alkoxy, acyloxy, amino, amido, enoxy, aminoxy, ketiminoxy or oxime function. These functions are well known as being reactive with silanol functions. The resulting product is most often called "functionalized oil". This reaction may be desired directly during preparation of the composition (functionalization in situ) or optionally as a preliminary step before adding the other components of the composition. In this preliminary step, it is common to use a functionalization catalyst such as lithia (or lithium hydroxide) or potash in order to endow the single-component composition with good stability in storage.

For this purpose, a person skilled in the art will be able to select specific functionalization catalysts and will adjust the amount of the reactants so as to have a molar excess of crosslinking agent relative to the silanol functions to be functionalized.

2. Crosslinking by hydrolysis of the functionalized oil generally due to water vapor that diffuses into the material from the surface exposed to the atmosphere, and condensation between the silanol groups formed and other residual reactive functions.

With regard to the compositions packaged in the form of a two-component composition (RTV-2), the first component (or part) comprises the polycondensable polyorganosiloxanes and the second component (or part), which is airtight, contains the catalyst and one or more crosslinking agents. The two components (or parts) are mixed at the time of use and the mixture hardens by crosslinking reactions in the form of a relatively hard elastomer, notably when the composition comprises reinforcing fillers. These compositions packaged in two-component systems are well known and are notably described in the work of Walter Noll "Chemistry and Technology of Silicones" 1968, 2nd edition, pages 395 to 398. These compositions most often comprise the following ingredients:

a reactive polyorganosiloxane with silanol groups at the end of the chain, for example α,ω-di(hydroxydimethylsilyl)(polydimethylsiloxane), in the chain, or both at the end of the chain and in the chain;

a crosslinking agent;

a condensation catalyst; and optionally water, often present when a dialkyltin dicarboxylate is used as catalyst, the water serving as activator for said catalyst.

Suitable catalysts are tin derivatives such compounds based on alkyltin, such as dibutyltin dilaurate (DBTDL). Alternative catalysts are known in the prior art, notably titanium-based catalysts (see for example international patent application WO 2013/036546). Other catalysts have been mentioned, for example catalysts based on zinc, scandium, ytterbium, copper, silver, cerium, molybdenum, bismuth, hafnium or guanidine derivatives. The use of chelates of zirconium or of titanium is described in particular in international patent application WO 01/49789. Other alternatives that maybe use as a catalyst are described in patent applications FR 2 856 694 or US2017022325.

Curable silicone compositions which cure via addition-curing reaction refers to compositions where curing is achieved through the reaction called "addition reaction" (or hydrosylation reaction) of a silicon-hydride group (Si—H) of a siloxane polymer with a silicon-alkenyl (Si-alkenyl) or a silicon-alkynyl (Si-alkynyl) group of a siloxane polymer creating an alkyl bridge between the two siloxane polymer. Metals belonging to the platinum group are suitable as catalysts of addition-curing reactions. Examples of suitable catalysts are platinum or rhodium compounds, germanium compounds such as those described in patent applications WO2016075414 or complexes of nickel, cobalt or iron, such as those described in patent applications WO2016071651, WO2016071652 and WO2016071654. The most used catalyst is usually a complex of platinum in alcohol, xylene, divinylsiloxanes or cyclic vinylsiloxanes. One advantage of addition-cure silicone compositions is that the reaction has no byproducts and it can occur rapidly.

All of the above standard curable compositions that are well known by a skilled person of the art are suitable according to the invention in view of adding:

(A) at least one organopolysiloxane gum C having a consistency of between 200 and 900 at 25° C., containing at least one silicon-bonded $C_6$ to $C_{12}$ aryl groups per molecule and containing at least one functional group per molecule chosen from the group consisting of: a silicon-bonded $C_2$ to $C_{20}$ alkenyl group, a silicon-bonded hydrogen atom, a silicon-bonded hydroxyl group, a silicon-bonded alkoxy group, a silicon-bonded oxime group, a silicon-bonded amino group, a silicon-bonded amido group, a silicon-bonded aminoxy group, a silicon-bonded acyloxy group, a silicon-bonded ketiminoxy group and a silicon-bonded enoxy group; and (E) at least one filler E as defined below.

Examples of functional group for condensation-curing silicone compositions are the following:

Hydrolyzable and condensable groups of the alkoxy type can be used. Examples include groups having from 1 to 8 carbon atoms such as the methoxy, ethoxy, n-propoxy, isopropoxy, n-butoxy, iso-butoxy, sec-butoxy, tert-butoxy, 2-methoxyethoxy, hexyloxy or octyloxy groups.

Hydrolyzable and condensable groups of alkoxy-alkylene-oxy type can be used. Examples include methoxy-ethylene-oxy group.

Hydrolyzable and condensable groups of amino type can be used. Examples include methylamino, dimethylamino, diethylamino, n-butylamino, sec-butylamino or cyclohexylamino groups.

Hydrolyzable and condensable groups of N-methyl-acetamido group.

Hydrolyzable and condensable groups of the acylamino type can be used. Examples include benzoyl-amino group.

Hydrolyzable and condensable groups of aminoxy type can be used. Examples include dimethylaminoxy, diethylaminoxy, dioctylaminoxy or diphenylaminoxy groups.

Hydrolyzable and condensable groups of iminoxy and in particular ketiminoxy type can be used. Examples include groups derived from the following oximes: acetophenone-oxime, acetone-oxime, benzophenone-oxime, methyl-ethyl-ketoxime, diisopropylketoxyme or methylisobutyl-ketoxime.

Hydrolyzable and condensable groups of the acyloxy type can be used. Examples include acetoxy group.

Hydrolyzable and condensable groups of the enoxy type can be used. Examples include 2-propenoxy group.

The consistency of the gum C is between 200 and 900 at 25° C., preferably between 300 and 900 at 25° C. or between 450 and 750 at 25° C.

The consistency can be determined, for example, by measuring the penetration using a penetration meter according to one of the AFNOR standards NFT 60119 or NFT 60123. Standard NFT60 123 is particularly suitable for this description.

The term "gum" is customarily used for organosilicic compounds having a viscosity of more than 600,000 mPa·s, which corresponds to a molecular weight of more than 200,000 g/mol. Gum firmness is measured at 25° C. by a PNR 12 or equivalent model penetrometer capable of applying a cylindrical head to the sample under standardized conditions. The hardness of the gum is represented by a value times the depth (mm) that the cylindrical body with memory penetrates into the sample over 1 minute. To do this, a gum sample is placed in an aluminum container having a diameter of 40 mm and a height of 60 mm. A bronze or brass cylindrical head having a diameter of 6.35 mm and a height of 4.76 mm is attached to a metal rod having a length of 51 mm and a diameter of 3 mm suitable for a penetration meter. A 100 g load weight is attached to this bar. The total weight of the assembly is 151.8 g. Place the gum sample container in a bath set at 25° C.±0.5° C. for a minimum of 30 seconds. Perform the measurement according to the manufacturer's instructions.

The viscosity of the gum C is greater than 10 million mPa·s measured at a shear rate of 0.01 s-1 at 25° C. In some embodiments, the viscosity of the gum C is greater than 20 million mPa·s measured at a shear rate of 0.01 s-1 at 25° C. In some embodiments, the viscosity of the gum C is greater than 40 million mPa·s measured at a shear rate of 0.01 s-1 at 25° C. In some embodiments, the viscosity of the gum C is greater than 60 million mPa·s measured at a shear rate of 0.01 s-1 at 25° C.

The viscosity of the gum can be measured using an Anton Paar type Rheometer, or equivalent with zero gap set between the 2 plateaus of 0.300 mm and a shear rate range of between 0.01 s-1 and 100 s-1 at 25.0° C. Preferably, viscosity of the gum is measured at a shear rate of 0.01 s-1 at 25° C.

In some embodiments, the at least one organopolysiloxane gum C comprises: at least one siloxy unit of formula (A-3):

 (A-3)

wherein the symbol "Alk" represents a $C_2$ to $C_{20}$ alkenyl group, such as a vinyl, allyl, hexenyl, decenyl, or tetradecenyl group, and the symbol R represents a $C_1$ to $C_{20}$ alkyl group, such as a methyl, ethyl, propyl, or a $C_6$-$C_{12}$ aryl group such as a xylyl, tolyl, or phenyl group, in which each instance of "Alk" and R can be the same or different, and
wherein h=1 or 2, and
at least one siloxy unit of formula (A-4):

 (A-4)

wherein the symbol "Ar" represents a $C_6$-$C_{12}$ aryl group optionally substituted by a $C_2$-$C_{20}$ alkylene group, such as a xylyl, tolyl, xylene, or phenyl group, or a $C_1$-$C_{20}$ aralkyl optionally substituted by a $C_2$-$C_{20}$ alkylene group, or a naphthyl group optionally substituted by a $C_1$-$C_{20}$ alkyl group and/or a $C_2$-$C_{20}$ alkylene group, or an anthracenyl group optionally substituted by a $C_1$-$C_{20}$ alkyl group and/or a $C_2$-$C_{20}$ alkylene group, and the symbol $R^1$ represents a $C_1$ to $C_{20}$ alkyl group, such as a methyl, ethyl, or propyl group, or a $C_2$ to $C_{20}$ alkenyl group, such as a vinyl, allyl, hexenyl, decenyl, or tetradecenyl group, in which each instance of "Ar" and $R^1$ can be the same or different, and
wherein h=0, 1, or 2,
wherein k=1 or 2, and wherein h+k=1, 2, or 3; and
other siloxy units of formula (A-2):

 (A-2)

wherein the symbol L represents a $C_1$ to $C_{20}$ alkyl group, such as a methyl, ethyl, propyl, and the symbol g is equal to 0, 1, 2, or 3, in which each instance of L can be the same or different.

In a preferred embodiment, the at least one organopolysiloxane gum C comprises:
at least one siloxy unit of formula (A-3):

 (A-3)

wherein the symbol "Alk" represents a vinyl group, and the symbol R represents a $C_1$ to $C_{20}$ alkyl group, such as a methyl, ethyl, propyl, in which each instance of "Alk" and R can be the same or different, and wherein h=1 or 2, and at least one siloxy unit of formula (A-4):

 (A-4)

wherein the symbol "Ar" represents a phenyl group, and the symbol $R^1$ represents a $C_1$ to $C_{20}$ alkyl group, such as a methyl, ethyl, or propyl group, or a $C_2$ to $C_{20}$ alkenyl group, such as a vinyl, allyl, hexenyl, decenyl, or tetradecenyl group, in which each instance of "Ar" and $R^1$ can be the same or different, and
wherein h=0 or 1, and
wherein k=2, and
other siloxy units of formula (A-2):

 (A-2)

in which the symbol L represents a $C_1$ to $C_{20}$ alkyl group, such as a methyl, ethyl, propyl, and the symbol g is equal to 0, 1, 2, or 3, in which each instance of L can be the same or different.

In some embodiments, the at least one organopolysiloxane gum C is a diphenylsiloxane-dimethylsiloxane-vinylmethylsiloxane copolymer gum.

In some embodiments, the at least one organopolysiloxane gum C is vinyl-terminated.

In some embodiments, the at least one organopolysiloxane gum C comprises less than 30 mole % of aryl groups. For example, the at least one organopolysiloxane gum C may comprise less than 28 mole % of aryl groups, less than 26 mole % of aryl groups, less than 24 mole % of aryl groups, less than 22 mole % of aryl groups, less than 20 mole % of aryl groups, less than 19 mole % of aryl groups, less than 18 mole % of aryl groups, less than 17 mole % of aryl groups, less than 16 mole % of aryl groups, less than 15 mole % of aryl groups, less than 14 mole % of aryl groups, less than 13 mole % of aryl groups, less than 12 mole % of aryl groups, less than 11 mole % of aryl groups, less than 10 mole % of aryl groups, less than 9 mole % of aryl groups, less than 8 mole % of aryl groups, less than 7 mole % of aryl groups, less than 6 mole % of aryl groups, less than 5 mole % of aryl groups, less than 4 mole % of aryl groups, less than 3 mole % of aryl groups, less than 2 mole % of aryl groups, or less than 1 mole % of aryl groups.

In some embodiments, the at least one organopolysiloxane gum C comprises from about 1 mole % to about 28 mole % of aryl groups. In some embodiments, the at least one organopolysiloxane gum C comprises from about 2 mole % to about 28 mole % of aryl groups, from about 3 mole % to about 28 mole % of aryl groups, from about 4 mole % to about 28 mole % of aryl groups, from about 5 mole % to about 28 mole % of aryl groups, from about 6 mole % to about 28 mole % of aryl groups, from about 7 mole % to about 28 mole % of aryl groups, from about 8 mole % to about 28 mole % of aryl groups, from about 9 mole % to about 28 mole % of aryl groups, from about 10 mole % to about 28 mole % of aryl groups, from about 11 mole % to about 28 mole % of aryl groups, from about 12 mole % to about 28 mole % of aryl groups, from about 13 mole % to about 28 mole % of aryl groups, from about 14 mole % to about 28 mole % of aryl groups, from about 15 mole % to about 28 mole % of aryl groups, from about 16 mole % to about 28 mole % of aryl groups, from about 17 mole % to about 28 mole % of aryl groups, from about 18 mole % to about 28 mole % of aryl groups, from about 19 mole % to about 28 mole % of aryl groups, from about 20 mole % to about 28 mole % of aryl groups, from about 21 mole % to about 28 mole % of aryl groups, from about 22 mole % to about 28 mole % of aryl groups, from about 23 mole % to about 28 mole % of aryl groups, from about 24 mole % to about 28 mole % of aryl groups, or from about 25 mole % to about 28 mole % of aryl groups.

In some embodiments, the at least one organopolysiloxane gum C comprises from about 1 mole % to about 26 mole % of aryl groups, from about 1 mole % to about 24 mole % of aryl groups, from about 1 mole % to about 22 mole % of aryl groups, from about 1 mole % to about 20 mole % of aryl groups, from about 1 mole % to about 19 mole % of aryl groups, from about 1 mole % to about 18 mole % of aryl groups, from about 1 mole % to about 17 mole % of aryl groups, from about 1 mole % to about 16 mole % of aryl groups, from about 1 mole % to about 15 mole % of aryl groups, from about 1 mole % to about 14 mole % of aryl groups, from about 1 mole % to about 13 mole % of aryl groups, from about 1 mole % to about 12 mole % of aryl groups, or from about 1 mole % to about 11 mole % of aryl groups, from about 1 mole % of aryl groups, from about 1 mole % to about 9 mole % of aryl groups, from about 1 mole % to about 8 mole % of aryl groups, from about 1 mole % to about 7 mole % of aryl groups, from about 1 mole % to about 6 mole % of aryl groups, from about 1 mole % to about 5 mole % of aryl groups, from about 1 mole % to about 4 mole % of aryl groups, from about 1 mole % to about 3 mole % of aryl groups, or from about 1 mole % to about 2 mole % of aryl groups.

In some embodiments, the at least one organopolysiloxane gum C comprises from about 10 mole % to about 20 mole % of aryl groups, from about 10 mole % to about 19 mole % of aryl groups, from about 10 mole % to about 18 mole % of aryl groups, from about 10 mole % to about 17 mole % of aryl groups, from about 10 mole % to about 16 mole % of aryl groups, from about 10 mole % to about 15 mole % of aryl groups, from about 10 mole % to about 14 mole % of aryl groups, from about 10 mole % to about 13 mole % of aryl groups, or from about 10 mole % to about 12 mole % of aryl groups.

In some embodiments, the at least one organopolysiloxane gum C comprises from about 2 mole % to about 14 mole % of aryl groups, from about 3 mole % to about 14 mole % of aryl groups, from about 4 mole % to about 14 mole % of aryl groups, from about 5 mole % to about 14 mole % of aryl groups, from about 6 mole % to about 14 mole % of aryl groups, from about 7 mole % to about 14 mole % of aryl groups, from about 8 mole % to about 14 mole % of aryl groups, from about 8 mole % to about 12 mole % of aryl groups, or from about 10 mole % to about 14 mole % of aryl groups.

The at least one filler E can be one or more of a reinforcing filler, a semi-reinforcing filler, a non-reinforcing filler, a packing mineral filler, a thermally conductive filler, an electrically conductive filler, and mixtures thereof.

In some embodiments, the reinforcing filler is selected from silicas and/or aluminas, preferably selected from silicas.

As silicas that may be used, fillers are envisaged characterized by a fine particle size often less than or equal to 0.1 μm and a high ratio of specific surface area to weight, generally lying within the range of approximately 50 square meters per gram to more than 300 square meters per gram. Silicas of this type are commercially available products and are well known in the art of the manufacture of adhesive silicone compositions. These silicas may be colloidal silicas, silicas prepared pyrogenically (silicas called combustion or fumed silicas) or by wet methods (precipitated silicas) of mixtures of these silicas.

The chemical nature and the method for preparing silicas capable of forming the filler E are not important for the purpose of the present invention, provided the silica is capable of exerting a reinforcing action on the final composition. Cuts of various silicas may of course also be used.

These silica powders have a mean particle size generally close to or equal to 0.1 μm and a BET specific surface area greater than 50 m$^2$/g, preferably between 50 and 400 m$^2$/g, notably between 150 and 350 m$^2$/g.

These silicas are optionally:
pretreated with the aid of at least one compatibilizing agent chosen from the group of molecules that satisfy at least two criteria:
have a high interaction with silica in the region of its hydrogen bonds with itself and with the surrounding silicone oil;
are themselves, or their degradation products, easily removed from the final mixture by heating under vacuum in a gas flow, and compounds of low molecular weight are preferred;
and/or treated in situ:
in a specific manner with the aid of at least one untreated silica,
and/or in a complementary manner by using at least one compatibilization agent of nature similar to that which can be used in pre-treatment and as defined above.

In situ treatment of the silica filler is understood to mean putting the filler and the compatibilizing agent in the presence of at least one portion of the preponderant silicone polymer referred to above.

The compatibilizing agent is chosen according to the treatment method (pre-treatment or in situ) and may for example be selected from the group comprising:
chlorosilanes,
polyorganocyclosiloxanes, such as octamethylcyclosiloxane (D4),
silazanes, preferably disilazanes, or mixtures thereof, hexamethyldisilazane (HMDZ) being the preferred silazane and that may be associated with divinyltetramethyl-disilazane,
polyorganosiloxanes having, per molecule, one or more hydroxyl groups linked to silicon,
amines such as ammonia or alkylamines with a low molecular weight such as diethylamine,
organic acids with a low molecular weight such as formic or acetic acids,
and mixtures thereof.

In the case of in situ treatment, the compatibilizing agent is preferably used in the presence of water.

For more details in this respect, reference may be made for example to patent FR-B-2 764 894.

As a variant, it is possible to use compatibilizing methods of the prior art providing early treatment by silazane (e.g. FR-A-2 320 324) or a delayed treatment (e.g. EP-A-462 032).

As a reinforcing alumina that may be used as the filler E, a highly dispersible alumina is advantageously employed, doped or not in a known manner. It is of course possible also to use cuts of various aluminas. As a non-limiting examples of such aluminas, reference may be made to aluminas A 125, CR 125, D 65CR from the Baikowski Company. Preferably, the reinforcing filler used is a combustion silica, taken alone or mixed with alumina.

Non siliceous minerals that may be included as semi-reinforcing or packing mineral fillers can be chosen from the group constituted of: carbon black, titanium dioxide, aluminium oxide, hydrated alumina, calcium carbonate, ground quartz, diatomaceous earth, zinc oxide, mica, talc, iron oxide, barium sulfate, slaked lime, plaster, glass, hollow glass beads, hollow plastic beads, plastic powder, calcium silicate, cristobalite, zeolite, bentonite.

As regards to weight, it is preferred to employ a quantity of filler E of between 5 and 40%, preferably between 10 and 35%, more preferably between 15 and 30% by weight based on all the constituents of the composition.

In a preferred embodiment, the present invention is a method for additive manufacturing a silicone elastomer article comprising the steps of:

1) printing a first addition-curable liquid silicone composition on a substrate with a 3D printer selected from an extrusion 3D printer or a material jetting 3D printer to form a first layer, 2) printing a second addition-curable liquid silicone composition on the first or previous layer with the said 3D printer to form a subsequent layer and 3) optionally repeating step 2) with independently selected addition-curable liquid silicone composition for any additional layer needed and 4) allowing the first and subsequent layers to crosslink, optionally by heating, to obtain a silicone elastomer article, wherein at least one layer of said addition-curable liquid silicone composition is the inventive addition-curable liquid silicone composition X as defined below.

In particular, the addition-curable liquid silicone composition X comprises:

(A) at least one organopolysiloxane A having at least two silicon-bonded $C_2$ to $C_{20}$ alkenyl groups per molecule, (B) at least one organosilicon crosslinker B containing at least 3 silicon-bonded hydrogen atoms per molecule, (C) at least one organopolysiloxane gum C having a consistency of between 200 and 900 at 25° C. and containing at least one silicon-bonded $C_2$ to $C_{20}$ alkenyl group per molecule and at least one silicon-bonded $C_6$ to $C_{12}$ aryl groups per molecule, (D) at least one addition reaction catalyst D, (E) at least one filler E, (F) optionally, at least one diorganohydrogensiloxy-terminated diorganopolysiloxane chain extender F, (G) optionally, at least one cure rate modifier G, (H) optionally, at least one silicone resin H, and (I) optionally, at least one additive I.

In particular, the addition-curable liquid silicone compositions X of the invention exhibit improved relaxation time compared to prior compositions. Relaxation time or recovery time, as defined herein, is the time required for a viscous substance to recover from shearing stress after no more shear has been applied. One way to measure the relaxation time is to consider the crossing point between the lines tangent to the initial and the final parts of the storage modulus curve. Thus, relaxation time provides an index of how quickly a composition retuns to its starting viscosity after shear, such as experienced during 3D printing when the compositions are extruded through a printing nozzle. The higher the value for relaxation time, the slower the recovery of viscosity is. The lower the value for relaxation time, faster the relaxation is. The faster a composition returns to its starting viscosity, the better the composition retains its shape during 3D printing.

In some embodiments, the addition-curable liquid silicone compositions X of the invention exhibit a relaxation time of ≤100 seconds after exposure to an applied shear rate of 1 rad $s^{-1}$. In a preferred embodiment, the addition-curable liquid silicone compositions X of the invention exhibit a relaxation time of ≤80 seconds, ≤70 seconds, ≤65 seconds, or ≤60 seconds after exposure to an applied shear rate of 1 rad $s^{-1}$.

In the first step of the method, the layer of the first addition-curable liquid silicone composition is printed onto a substrate such that the layer is formed on the substrate. The substrate is not limited and may be any substrate. The substrate is selected such that it can support the 3D article during its method of manufacturing, such as, for example, the substrate plate of the 3D printer. The substrate can be rigid or flexible and can be continuous or discontinuous. The substrate may itself be supported, for example, by a substrate table or plate, such that the substrate need not be rigid. It may also be removable from the 3D article. Alternatively, the substrate can be physically or chemically bonded to the 3D article. In one embodiment, the substrate may be in silicone.

The layer formed by printing the first addition-curable liquid silicone composition may have any shape and any dimension. The layer can be continuous or discontinuous.

In the second step, a subsequent layer is formed by printing a second addition-curable liquid silicone composition onto the previous layer, formed in the first step, with an extrusion 3D printer or a material 3D jetting printer. The extrusion 3D printer and the material 3D jetting printer may be the same as or different from the extrusion 3D printer or a material 3D jetting printer utilized in step 1).

The second addition-curable liquid silicone composition may be the same as or different from the first addition-curable liquid silicone composition.

The subsequent layer formed by printing the second addition-curable liquid silicone composition may have any shape and any dimension. The subsequent layer can be continuous or discontinuous.

In the third step, the second step is repeated to obtain as many layers as needed.

In the fourth step, by allowing the layers to cure, optionally by heating, a silicone elastomer article is obtained. Curing, or crosslinking, can be completed at ambient temperature. Usually, ambient or room temperature refers to a temperature between 20° C. and 25° C.

Heating may be used to accelerate the crosslinking or curing of the layers. A thermal cure after printing can be done at a temperature between 50° C. and 200° C., preferably between 100° C. and 150° C., in order to achieve complete cure or crosslinking faster.

In this document, the term "layer" may relate to the layers at any stage of the method, first or previous or subsequent layer. The layers can be each of various dimensions, including thickness and width. Thickness of the layers can be uniform or may vary. Average thickness is related to the thickness of the layer immediately after printing.

In an embodiment, the layers independently have a thickness of from 10 to 3000 μm, preferably from 50 to 2000 μm, more preferably from 100 to 800 μm, and most preferably from 100 to 600 μm.

In a particular embodiment, no energy source, such as heat or radiation, is applied during or between steps 1) to 3) prior to the printing of at least 10, preferably 20 layers.

3D printing is generally associated with a host of related technologies used to fabricate physical objects from computer generated, e.g., computer-aided design (CAD), data sources.

This disclosure generally incorporates ASTM Designation F2792-12a, Standard Terminology for Additive Manufacturing Technologies. Under this ASTM standard:

"3D printer" is defined as "a machine used for 3D printing" and "3D printing" is defined as "the fabrication of objects through the deposition of a material using a print head, nozzle, or another printer technology."

"Additive manufacturing (AM)" is defined as "a process of joining materials to make objects from 3D model data, usually layer upon layer, as opposed to subtractive manufacturing methodologies. Synonyms associated with, and encompassed by, 3D printing include additive fabrication, additive processes, additive techniques, additive layer manufacturing, layer manufacturing, and freeform fabrication." Additive manufacturing (AM) may also be referred to as rapid prototyping (RP). As used herein, "3D printing" is generally interchangeable with "additive manufacturing" and vice versa.

"Printing" is defined as depositing of a material, here a liquid silicone composition, using a print head, nozzle, or another printer technology.

In this disclosure, "3D or three-dimensional article, object or part" means an article, object or part obtained by additive manufacturing or 3D printing as disclosed herein.

In general, all 3D printing processes have a common starting point, which is a computer-generated data source or program which may describe an object. The computer-generated data source or program can be based on an actual or virtual object. For example, an actual object can be scanned using a 3D scanner and scan data can be used to make the computer-generated data source or program. Alternatively, the computer-generated data source or program may be designed from scratch.

The computer-generated data source or program is typically converted into a standard tessellation language (STL) file format; however other file formats can also or additionally be used. The file is generally read into 3D printing software, which takes the file and optionally user input to separate it into discrete "slices" of user-defined thickness. The 3D printing software typically outputs machine instructions, which may be in the form of G-code, which is read by the 3D printer to build each slice. The machine instructions are transferred to the 3D printer, which then builds the object, layer by layer, based on this slice information in the form of machine instructions. Thicknesses of these slices may vary.

An extrusion 3D printer is a 3D printer where the material is extruded through a nozzle, syringe or orifice during the additive manufacturing process. Material extrusion generally works by extruding material through a nozzle, syringe or orifice to print one cross-section of an object, which may be repeated for each subsequent layer. The extruded material bonds to the layer below it during cure of the material.

In a preferred embodiment, the method for additive manufacturing a three-dimensional silicone elastomer article uses an extrusion 3D printer. Addition-curable liquid silicone compositions are extruded through a nozzle. The nozzle may be heated to aid in dispensing the addition-curable liquid silicone composition.

The average diameter of the nozzle defines the thickness of the layer. In an embodiment, the diameter of the layer is from 50 µm to 3000 µm, preferably from 100 µm to 800 µm and most preferably from 100 µm to 500 µm.

The distance between the nozzle and the substrate is an important parameter to assure proper shape of the resulting silicone elastomer. Preferably, the distance between the nozzle and the substrate is from 60 to 150%, more preferably from 80 to 120%, of the nozzle average diameter.

The addition-curable liquid silicone composition to be dispensed through the nozzle may be supplied from a cartridge-like system. The cartridge may include a nozzle or nozzles with an associated fluid reservoir or fluid reservoirs. It is also possible to use a coaxial two cartridge system with a static mixer and only one nozzle. Pressure will be adapted to the fluid to be dispensed, the associated nozzle average diameter, and the printing speed.

Because of the high shear rate occurring during the nozzle extrusion, the viscosity of the addition-curable liquid silicone compositions is greatly lowered and so permits the printing of fine layers.

Cartridge pressure can vary from 1 to 20 bar, preferably from 2 to 10 bar, and most preferably from 4 to 8 bar. When nozzle diameters lower than 100 µm are used, cartridge pressure should be higher than 20 bar to get good material extrusion. An adapted equipment using aluminum cartridges shall be used to resist such a pressure.

The nozzle and/or build platform moves in the X,Y (horizontal plane) to complete the cross section of the object, before moving in the Z axis (vertical) plane once one layer is complete. The nozzle has a high XYZ movement precision around 10 µm. After each layer is printed in the (X,Y) work plane, the nozzle is displaced in the Z direction only far enough that the next layer can be applied in the (X,Y) work plane. In this way, the object which becomes the 3D article is built one layer at a time from the bottom upwards.

Advantageously, the printing speed is between 1 and 50 mm/s, preferably between 5 and 30 mm/s to obtain the best compromise between accuracy and manufacture speed.

"Material jetting" is defined as "an additive manufacturing process in which droplets of build material are selectively deposited." The material is applied with the aid of a printing head in the form of individual droplets, discontinuously, at the desired location of the work plane (jetting). A 3D apparatus and a process for the step-by-step production of 3D structures with a printing head arrangement comprising at least one, preferably 2 to 200, printing head nozzles allows the site-selective application, where appropriate, of a plurality of materials. The application of the materials by means of inkjet printing imposes specific requirements on the viscosity of the materials.

In a material 3D jetting printer, one or a plurality of reservoirs are subject to pressure and being connected via a metering line to a metering nozzle. Upstream or downstream of the reservoir, there may be devices which make it possible for multicomponent addition-curable liquid silicone compositions to be homogeneously mixed and/or to evacuate dissolved gases. One, or a plurality, of jetting apparatuses operating independently of one another may be present to construct the silicone elastomer article from different addition-curable liquid silicone compositions, or, in the case of more complex structures, to permit composite parts made from silicone elastomers and other plastics.

Because of the high shear rate occurring in the metering valve during the jetting metering procedure, the viscosity of such addition-curable liquid silicone compositions is greatly lowered and so permits the jetting metering of very fine microdroplets. After the microdrop has been deposited on the substrate, there is a sudden reduction in its shear rate, and so its viscosity climbs again. Because of this, the deposited drop rapidly becomes of high viscosity again and permits the shape-precise construction of three-dimensional structures.

The individual metering nozzles can be positioned accurately in x-, y-, and z-directions to permit precisely targeted deposition of the addition-curable liquid silicone composition on the substrate or, in the subsequent course of formation of shaped parts, on the addition-curable liquid silicone composition which has already been placed and which, optionally, has already been cured.

In contrast to other additive manufacturing methods, it is unnecessary to carry out the inventive method in an irradiated or heated environment to initiate the curing after each layer is printed to avoid the collapse of the structure. Thus, irradiation and heating steps may be optional.

Typically, the 3D printer utilizes a dispenser, e.g., a nozzle or print head, for printing the particular addition-curable liquid silicone composition(s). Optionally, the dispenser may be heated before, during, and after dispensing the addition-curable liquid silicone composition(s). More than one dispenser may be utilized with each dispenser having independently selected properties.

In one embodiment, this method can use support material to build the object. If the object is printed using support material or rafts, after the printing process is complete, they are typically removed leaving behind the finished object.

Optionally, the resulting articles may be subjected to different post-processing regimens. In an embodiment, the method further comprises the step of heating the three-dimensional silicone article. Heating can be used to expedite cure. In another embodiment, the method further comprises the step of further irradiating the three-dimensional silicone article. Further irradiation can be used to expedite cure. In another embodiment, the method further comprises both steps of heating and irradiating the three-dimensional silicone article.

Optionally, post-processing steps can greatly improve the surface quality of the printed articles. Sanding is a common way to reduce or remove the visibly distinct layers of the model. Spraying or coating the surface of the elastomer article can also be used to reduce the visibly distinct layers of the model but also modify the aspect and properties of the surface.

A surfacing treatment with a laser can also be done.

For medical applications, a sterilization of the final elastomer article can be obtained by heating the object at >100° C. or in an UV oven.

The first and second addition-curable liquid silicone compositions may be the same as or different from one another, and when step 3) is repeated, independently selected addition-curable liquid silicone compositions may be utilized. In the inventive method, at least one layer of addition-curable liquid silicone compositions is the inventive addition-curable liquid silicone composition X, which may be, for example, the first or second addition-curable liquid silicone composition or any other additional layer of the addition-curable liquid silicone composition. In an embodiment, all printed layers of the addition-curable liquid silicone compositions are inventive addition-curable liquid silicone compositions X.

For purposes of brevity, the first and second addition-curable liquid silicone compositions, along with any other addition-curable liquid silicone compositions optionally utilized when step 3) is repeated, are referred to below collectively merely as "the addition-curable liquid silicone composition" or "the silicone compositions".

The addition-curable liquid silicone composition X of the invention may be prepared by merely mixing the ingredients in the desired ratios. However, for reasons of storage stability and bath life before or during application of the compositions to the substrate(s), it is advantageous to store the composition X in two parts A and B, by separating the curing catalyst (D) from the organosilicon crosslinker (B) and/or the diorganopolysiloxanes (F), which bear hydrogen substituents. The other components of the compositions X are often distributed over both parts in proportions which will allow easy mixing of the two parts immediately prior to application. Such easy mixing ratios may be e.g., 1/10 or 1/1 ratios.

Preferably, two-part addition-curable liquid silicone compositions X of the invention comprise a first liquid composition comprising components A and D, but not B and not F; and a second liquid composition comprising components A, B, C, and optionally F, but not D.

The addition-curable liquid silicone composition X of the invention comprises at least one organopolysiloxane gum C and at least one filler E which are as described above.

The addition-curable liquid silicone composition X of the invention comprises at least one alkenyl group-containing organopolysiloxane A having two silicon-bonded alkenyl groups per molecule. In some embodiments, the addition-curable liquid silicone composition X of the invention comprises more than one alkenyl group-containing organopolysiloxane A having two silicon-boned alkenyl groups per molecule. For example, the curable liquid silicone rubber composition of the invention may comprise two or more alkenyl group-containing organopolysiloxanes A (A1, A2, A3, etc.) each having two silicon-bonded alkenyl groups per molecule.

In some embodiments, the at least one alkenyl group-containing organopolysiloxane A comprises:

two siloxy units of formula (A-1):

$$(Alk)(R)_2SiO_{1/2} \quad (A\text{-}1)$$

in which: the symbol "Alk" represents a $C_2$ to $C_{20}$ alkenyl group, such as a vinyl, allyl, hexenyl, decenyl, or tetradecenyl group, preferably a vinyl group hydrogen atom, and the symbol R represents a $C_1$ to $C_{20}$ alkyl group, such as a methyl, ethyl, propyl, trifluoropropyl, or aryl group, preferably a methyl group, and other siloxy units of formula (A-2):

$$(L)_g SiO_{(4-g)/2} \quad (A\text{-}2)$$

in which the symbol L represents a $C_1$ to $C_{20}$ alkyl group, such as a methyl, ethyl, propyl, trifluoropropyl, or aryl group, preferably a methyl group, and the symbol g is equal to 0, 1, 2 or 3, in which each instance of L can be the same or different.

In some preferred embodiments, the at least one alkenyl group-containing organopolysiloxane A is of the following formula (1):

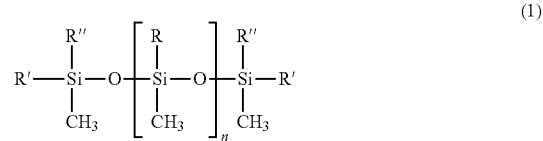

(1)

in which:
n is an integer ranging from 1 to 1000, preferably from 50 to 1000,
R is a $C_1$ to $C_{20}$ alkyl group, such as a methyl, ethyl, propyl, trifluoropropyl, or aryl group, preferably a methyl group,
R' is a $C_2$ to $C_{20}$ alkenyl group, such as a vinyl, allyl, hexenyl, decenyl, or tetradecenyl group, preferably a vinyl group, and
R" is a $C_1$ to $C_{20}$ alkyl group, such as a methyl, ethyl, propyl, trifluoropropyl, or aryl group, preferably a methyl group.

In a preferred embodiment, the at least one alkenyl group-containing organopolysiloxane A is one or more α,ω-vinyl polydimethylsiloxane(s), more preferably, one or more linear α,ω-vinyl polydimethylsiloxane(s).

In some embodiments, the viscosity of the at least one alkenyl group-containing organopolysiloxane A is between about 50 to about 100,000 mPa·s., preferably between about 100 to about 50,000 mPa·s., more preferably between about 150 to about 25,000 mPa·s. In some embodiments, the curable liquid silicone rubber composition of the invention comprises at least one alkenyl group-containing organopolysiloxane A1 having a viscosity between about 50 to about 10,000 mPa·s. and at least one alkenyl group-containing organopolysiloxane A2 having a viscosity between about 5,000 to about 100,000 mPa·s. In a preferred embodiment, the viscosity of the at least one alkenyl group-containing organopolysiloxane A1 is between about 100 to about 7,500 mPa·s., more preferably between about 150 to about 5,000 mPa·s. In a preferred embodiment, the viscosity of the at least one alkenyl group-containing organopolysiloxane A2 is between about 7,500 to about 50,000 mPa·s., more preferably between about 10,000 to about 25,000 mPa·s.

The viscosities of the silicone compositions and their individual constituents described herein (except the organosiloxane gum C discussed above) correspond to a "Newtonian" dynamic viscosity magnitude at 25° C., i.e. the dynamic viscosity which is measured, in a manner that is known per se, with a Brookfield viscometer at a shear rate gradient that is low enough for the measured viscosity to be independent of the rate gradient.

In some embodiments, the molecular weight of the at least one alkenyl group-containing organopolysiloxane A is between about 500 g/mol to about 90,000 g/mol, preferably between about 1,000 g/mol to about 70,000 g/mol, more preferably between about 5,000 g/mol to about 60,000 g/mol. In some embodiments, the curable liquid silicone rubber composition of the invention comprises at least one alkenyl group-containing organopolysiloxane A1 having a molecular weight between about 1,000 to about 50,000 g/mol and at least one alkenyl group-containing organopolysiloxane A2 having a molecular weight between about 5,000 to about 80,000 g/mol. In a preferred embodiment, the molecular weight of the at least one alkenyl group-containing organopolysiloxane A1 is between about 5,000 to about 40,000 g/mol, more preferably between about 7,000 to about 30,000 g/mol. In a preferred embodiment, the molecular weight of the at least one alkenyl group-containing organopolysiloxane A2 is between about 15,000 to about 75,000 g/mol, more preferably between about 30,000 to about 60,000 g/mol.

The at least one alkenyl group-containing organopolysiloxane A is preferably linear.

The addition-curable liquid silicone composition X of the invention further comprises at least one organosilicon crosslinker B containing at least two, preferably at least three silicon-bonded hydrogen atoms per molecule. In some embodiments, the organosilicon crosslinker B containing at least two silicon-bonded hydrogen atoms per molecule is an organohydrogenpolysiloxane comprising from 10 to 500 silicon atoms within each molecule, preferably from 10 to 250 silicon atoms within each molecule.

Examples of suitable organosilicon crosslinker B containing at least two silicon-bonded hydrogen atoms per molecule when it is a branched polymer include branched polymers of formula (I):

$$(R_2HSiO_{1/2})_x(R_3SiO_{1/2})_y(R_2SiO_{2/2})_z(R_2SiO_{2/2})_p$$
$$(RSiO_{3/2})_q(HSiO_{3/2})_v(SiO_{4/2})_r \qquad (I)$$

where H is hydrogen and R is a one to forty carbon atom monovalent hydrocarbon radical, preferably a one to twenty carbon monovalent hydrocarbon radical, more preferably selected from the group consisting of methyl, ethyl, propyl, iso-propyl, n-butyl, iso-butyl, sec-butyl, tert-butyl, pentyl, hexyl, heptyl, phenyl, benzyl, and mesityl; and most preferably selected from the group consisting of methyl and phenyl, and where x≥2, y≥0, z≥0, p≥0, v≥0, and at least one of q or r≥1; alternatively x≥2, y≥0, z≥0, p≥0, q≥0; v≥0, r≥1; alternatively, x≥2, y≥0, r≥1 (with the proviso that when r=1, x+y=4) and z, p, q, v=0. Alternatively, x>2, y>0, r>1 and z, p, q, v=0.

Specific crosslinkers B containing at least two silicon-bonded hydrogen atoms per molecule when it is a branched polymer include but are not limited to: silicone resins $M^HQ$ comprising: $(H)(CH_3)_2SiO_{1/2}$ siloxy units ($M^H$) and $SiO_{4/2}$ siloxy units (Q units), silicone resins $MM^HQ$ comprising: $(CH_3)_3SiO_{1/2}$ siloxy units (M), $(CH_3)_2HSiO_{1/2}$ siloxy units ($M^H$) and $SiO_{4/2}$ (Q), silicone resins $M^HD^HQ$ comprising: $(CH_3)_2HSiO_{1/2}$ siloxy units ($M^H$), $(CH_3)HSiO_{2/2}$ ($D^H$) and $SiO_{4/2}$ siloxy units (Q) and silicone resins $MM^HD^HQ$ comprising: $(CH_3)_3SiO_{1/2}$ units (M units), $(CH_3)_2HSiO_{1/2}$ ($M^H$), $(CH_3)HSiO_{2/2}$ ($D^H$) and $SiO_{4/2}$ units (Q).

In some embodiments, the crosslinker B is a MHQ silicone resin comprising at least two MH siloxy units of formula $R2HSiO_{1/2}$ and Q siloxy unit of formula $SiO_{4/2}$, formulas where H is a hydrogen atom and where R is a one to forty carbon atom monovalent hydrocarbon radical, preferably a one to twenty carbon monovalent hydrocarbon radical, more preferably selected from the group consisting of methyl, ethyl, propyl, iso-propyl, n-butyl, iso-butyl, sec-butyl, tert-butyl, pentyl, hexyl, heptyl, phenyl, benzyl, and mesityl; and most preferably selected from the group consisting of methyl and phenyl.

In a preferred embodiment, the crosslinker B is a MHQ silicone resin having the formula:

$$MH_wQ_z$$

where Q has the formula $SiO_{4/2}$ and where MH has the formula $R2HSiO_{1/2}$, where H is a hydrogen atom and R is a one to forty carbon atom monovalent hydrocarbon radical, preferably a one to twenty carbon monovalent hydrocarbon radical, more preferably selected from the group consisting of methyl, ethyl, propyl, iso-propyl, n-butyl, iso-butyl, sec-butyl, tert-butyl, pentyl, hexyl, heptyl, phenyl, benzyl, and mesityl; and most preferably selected from the group consisting of methyl and phenyl, with the subscripts w and z having a ratio of 0.5 to 4.0 respectively, preferably 0.6 to 3.5, more preferably 0.75 to 3.0, and most preferably 1.0 to 3.0.

In another preferred embodiment, the crosslinker B is a MHQ silicone resin having the formula:

$$(MH_wQ_z)_j$$

where Q has the formula $SiO_{4/2}$ and where MH has the formula $R2HSiO_{1/2}$, where H is a hydrogen atom and R is a one to forty carbon atom monovalent hydrocarbon radical, preferably a one to twenty carbon monovalent hydrocarbon radical, more preferably selected from the group consisting of methyl, ethyl, propyl, iso-propyl, n-butyl, iso-butyl, sec-butyl, tert-butyl, pentyl, hexyl, heptyl, phenyl, benzyl, and mesityl; and most preferably selected from the group consisting of methyl and phenyl, with the subscripts w and z having a ratio of 0.5 to 4.0 respectively, preferably 0.6 to 3.5, more preferably 0.75 to 3.0, and most preferably 1.0 to 3.0; and the subscript j ranging from about 2.0 to about 100, preferably from about 2.0 to about 30, more preferably from about 2.0 to about 10, and most preferably from about 3.0 to about 5.0.

In another preferred embodiment, the crosslinker B is a silicone resin having from 0.10 wt. % to 2.00 wt. % H as SiH and comprising MH siloxy units of formula R2HSiO$_{1/2}$ and Q siloxy unit of formula SiO$_{4/2}$, where H is a hydrogen atom and R is a one to forty carbon atom monovalent hydrocarbon radical, preferably a one to twenty carbon monovalent hydrocarbon radical, more preferably selected from the group consisting of methyl, ethyl, propyl, iso-propyl, n-butyl, iso-butyl, sec-butyl, tert-butyl, pentyl, hexyl, heptyl, phenyl, benzyl, and mesityl; and most preferably selected from the group consisting of methyl and phenyl.

The at least one organosilicon crosslinker B can be included in the addition-curable liquid silicone composition X in an amount from about 0.01% to about 5%, preferably from about 0.05% to about 2%, preferably from about 0.1% to about 1% by weight of the total composition.

The organosilicon crosslinker B preferably contains between 0.45% to 50% SiH by weight, more preferably between 1% to 35% SiH by weight, more preferably between 5% to 30% SiH by weight or between 15% to 25% SiH by weight.

In some embodiments, the organosilicon crosslinker B comprises:

(i) at least two, preferably three, siloxy units of formula (XL-1) which may be identical or different:

(H)(Z)$_e$SiO$_{(3-e)/2}$        (XL-1)

in which:

H represents a hydrogen atom,

Z represents an alkyl having from 1 to 8 carbon atoms inclusive, and e is equal to 0, 1 or 2;

and/or (ii) at least one, and preferably from 1 to 550 of siloxy unit(s) of formula (XL-2):

(Z)$_g$ SiO$_{(4-g)/2}$        (XL-2)

in which:

Z represents an alkyl having from 1 to 8 carbon atoms inclusive, and g is equal to 0, 1, 2 or 3.

In some embodiments, Z in XL-1 and/or XL-2 is selected from methyl, ethyl, propyl and 3,3,3-trifluoropropyl groups, cycloalkyl groups, such as cyclohexyl, cycloheptyl or cyclooctyl groups, and aryl groups such as xylyl, tolyl and phenyl groups. Preferably, Z is a methyl group. However, Z in XL-1 and XL-2 may be the same or different.

In a preferred embodiment, e in XL-1 is 1 or 2.

In a preferred embodiment, g in XL-2 is 2.

In a preferred embodiment, the organosilicon crosslinker B comprises from 3 to 60 siloxy units of formula (XL-1) and from 1 to 250 siloxy unit(s) of formula (XL-2).

The addition-curable liquid silicone composition X of the invention further comprises at least one organopolysiloxane gum C described above containing at least one silicon-bonded C$_2$ to C$_{20}$ alkenyl group per molecule and at least one silicon-bonded C$_6$ to C$_{12}$ aryl groups per molecule.

In some embodiments, the at least one organopolysiloxane gum C can be included in the addition-curable liquid silicone composition X in an amount from about 0.1% to about 40% by weight, preferably from 1% to about 40% by weight, preferably from about 3% to about 30% by weight and even more preferably from about 5% to about 25% by weight of the total composition.

In some embodiments, the at least one organopolysiloxane gum C can be included in the addition-curable liquid silicone composition X in an amount from at least 5 parts by weight, at least 8 parts by weight, at least 10 parts by weight, at least parts by weight, or at least 20 parts by weight of the total addition-curable liquid silicone composition X.

In some embodiments, the at least one organopolysiloxane gum C can be included in the addition-curable liquid silicone composition X in an amount such that the total aryl-group content in mole % is at least 0.5 mole %. For example, the at least one organopolysiloxane gum C can be included in the addition-curable liquid silicone composition X in an amount such that the total aryl-group content in mole % is at least 0.6 mole %, at least 0.7 mole %, at least 0.8 mole %, at least 0.9 mole %, at least 1.0 mole %, at least 1.1 mole %, at least 1.2 mole %, at least 1.3 mole %, at least 1.4 mole %, at least 1.5 mole %, at least 1.6 mole %, at least 1.7 mole %, at least 1.8 mole %, at least 1.9 mole %, or at least 2.0 mole %.

In some embodiments, the at least one organopolysiloxane gum C can be included in the addition-curable liquid silicone composition X in an amount such that the total aryl-group content in mole % is from about 0.5 mole % to about 10 mole %, from about 0.5 mole % to about 9 mole %, from about 0.5 mole % to about 8 mole %, from about 0.5 mole % to about 7 mole %, from about 0.5 mole % to about 6 mole %, from about 0.5 mole % to about 5.5 mole %, from about 0.5 mole % to about 5 mole %, from about 0.5 mole % to about 4.5 mole %, from about 0.5 mole % to about 4 mole %, from about 0.5 mole % to about 3.5 mole %, from about 0.5 mole % to about 3 mole %, from about 0.5 mole % to about 2.5 mole %, from about 0.5 mole % to about 2 mole %, from about 0.5 mole % to about 1.5 mole %, from about 0.5 mole % to about 1.4 mole %, from about 0.5 mole % to about 1.3 mole %, from about 0.5 mole % to about 1.2 mole %, from about 0.5 mole % to about 1.1 mole %, from about 0.5 mole % to about 1.0 mole %, from about 0.5 mole % to about 0.9 mole %, from about 0.5 mole % to about 0.8 mole %, or from about 0.5 mole % to about 0.7 mole %.

In some embodiments, the at least one organopolysiloxane gum C can be included in the addition-curable liquid silicone composition X in an amount such that the total aryl-group content in mole % is from about 1 mole % to about 10 mole %, from about 1.2 mole % to about 10 mole %, from about 1.4 mole % to about 10 mole %, from about 1.6 mole % to about 10 mole %, from about 1.8 mole % to about 10 mole %, from about 2 mole % to about 10 mole %, from about 2.2 mole % to about mole %, from about 2.4 mole % to about 10 mole %, from about 2.6 mole % to about 10 mole %, from about 2.8 mole % to about 10 mole %, from about 3 mole % to about 10 mole %, from about 3.5 mole % to about 10 mole %, from about 4 mole % to about 10 mole %, from about 5 mole % to about 10 mole %, from about 6 mole % to about 10 mole %, from about 7 mole % to about 10 mole %, from about 8 mole % to about 10 mole %, or from about 9 mole % to about 10 mole %.

In some embodiments, the at least one organopolysiloxane gum C can be included in the addition-curable liquid silicone composition X in an amount such that the total aryl-group content in mole % is from about 1.2 mole % to about 7 mole %, from about 1.4 mole % to about 6 mole %, from about 1.6 mole % to about 6 mole %, from about 1.8 mole % to about 6 mole %, from about 2 mole % to about 6 mole %, from about 2.2 mole % to about 6 mole %, from about 2.4 mole % to about 6 mole %, from about 2.6 mole % to about 6 mole %, from about 2.8 mole % to about 6 mole %, from about 3 mole % to about 6 mole %, or from about 4 mole % to about 6 mole %, from about 1.2 mole % to about 5 mole %, from about 1.2 mole % to about 4 mole %, from about 1.2 mole % to about 3 mole %, from about 1.2 mole % to about 2.8 mole %, from about 1.2 mole % to about 2.6 mole %, from about 1.2 mole % to about 2.4 mole %, from about 1.4 mole % to about 4 mole %, from about 1.4 mole % to about 3 mole %, from about 1.4 mole % to about 2.8 mole %, from about 1.4 mole % to about 2.6 mole %, from about 1.4 mole % to about 2.4 mole %, from about 1.6 mole % to about 4 mole %, from about 1.6 mole % to about 3 mole %, from about 1.6 mole % to about 2.8 mole %, from about 1.6 mole % to about 2.6 mole %, from about 1.6 mole % to about 2.4 mole %, from about 1.8 mole % to about 4 mole %, from about 1.8 mole % to about 3 mole %, from about 1.8 mole % to about 2.8 mole %, from about 1.8 mole % to about 2.6 mole %, or from about 1.8 mole % to about 2.4 mole %.

The addition-curable liquid silicone composition X of the invention further comprises at least one addition reaction catalyst D. The addition reaction catalyst D can be included at any amount capable of curing the composition. For example, the addition reaction catalyst D can be included at an amount where the quantity of a platinum group metal in catalyst D is from 0.01 to 500 parts per weight per 1,000,000 parts by weight of the alkenyl group-containing organopolysiloxane A.

The catalyst D may notably be chosen from compounds of platinum and rhodium. It is possible, in particular, to use platinum complexes and an organic product described in U.S. Pat. Nos. 3,159,601, 3,159,602, 3,220,972 and European patents EP-A-0 057 459, EP-A-0 118 978 and EP-A-0 190 530, complexes of platinum and vinylorganosiloxanes described in U.S. Pat. Nos. 3,419,593, 3,715,334, 3,377,432 and 3,814,730. In a preferred embodiment, the addition reaction catalyst D is a platinum group metal-containing catalyst.

The addition-curable liquid silicone composition X further comprises at least one filler E as defined above.

The addition-curable liquid silicone compositions X of the invention may also contain at least one diorganohydrogensiloxy-terminated diorganopolysiloxane chain extender F. The at least one diorganohydrogensiloxy-terminated diorganopolysiloxane chain extender F can be included in the addition-curable liquid silicone composition X in an amount from 0% to about 20%, preferably from about 0.5% to about 15%, preferably from about 0.5% to about 10% by weight of the total composition.

In some embodiments, the diorganohydrogensiloxy-terminated diorganopolysiloxane F is of the following formula (2):

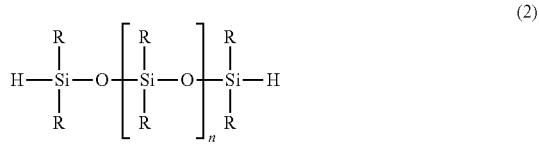

in which:
R is independently selected from a $C_1$ to $C_{20}$ alkyl group or a $C_6$ to $C_{12}$ aryl group such as a xylyl, tolyl, or phenyl group, preferably R is independently selected from the group consisting of: methyl, ethyl, propyl, and aryl, and most preferably R is methyl, and
n is an integer ranging from 1 to 500, preferably from 2 to 100, and more preferably from 3 to 50.

In some embodiments, the viscosity of the at least one diorganohydrogensiloxy-terminated diorganopolysiloxane F is between about 1 to about 500 mPa·s., preferably between about 2 to about 100 mPa·s., more preferably between about 4 to about 50 mPa·s. or between about 5 to about 20 mPa·s.

In some embodiments, the molecular weight of the at least one diorganohydrogensiloxy-terminated diorganopolysiloxane F is between about 100 to about 5,000 g/mol, preferably between about 250 to about 2,500 g/mol, more preferably between about 500 to about 1,000 g/mol.

The addition-curable liquid silicone compositions X of the invention may also contain at least one cure rate modifier G. The cure rate modifier G may be a crosslinking inhibitor G1 and/or a crosslinking retardant G2, for example.

Crosslinking inhibitors are also well known. Examples of crosslinking inhibitors G1 that may be used as the cure rate modifier G include polyorganosiloxanes, advantageously cyclic and substituted by at least one alkenyl group, tetramethylvinyltetrasiloxane being particularly preferred, pyridine, phosphine and organic phosphites, unsaturated amides, alkylated maleates and acetylenic alcohols. These acetylenic alcohols (cf. FR-B-1 528 464 and FR-A-2 372 874), which form part of the preferred thermal blockers of the hydrosilylation reaction, have the formula:

in which:
R is a linear or branched alkyl radical, or a phenyl radical;
R' is H or a linear or branched alkyl radical, or phenyl radical;
the radicals R, R' and the carbon atom situated in the alpha position of the triple bond being possibly able to form a ring;
the total number of carbon atoms contained in R and R' being at least 5, preferably 9 to 20.

Said alcohols are preferably chosen from those having a boiling point about 250° C. As examples, mention may be made of:
ethynyl-1-cyclohexanol (ECH);
methyl-3 dodecyne-1 ol-3;
trimethyl-3,7,11 dodecyne-1 ol-3;
diphenyl-1,1 propyne-2 ol-1
ethyl-3 ethyl-6 nonyne ol-3;
methyl-3 pentadecyne-1 ol-3.

These alpha-acetylenic alcohols are commercial products.

Such a regulator is present at a maximum of 2,000 ppm, preferably in an amount of from 20 to 50 ppm based on the total weight of organopolysiloxanes A, B, C, and optionally F.

Examples of crosslinking retardants G2 that may be used as the cure rate modifier G include so-called inhibitors for controlling the crosslinking reaction and extending the pot life of the silicone composition. Examples of advantageous crosslinking retardants G2 that may be used as the cure rate modifier G include, for example, vinylsiloxanes, 1,3-divinyltetra-methyldisiloxane, or tetravinyl-tetramethyl-tetracyclosiloxanes. It is also possible to use other known inhibitors, for example ethynylcyclohexanol, 3-methylbutynol, or dimethyl maleate.

The addition-curable liquid silicone compositions X of the invention may also contain a silicone resin H. Silicone resins are branched organopolysiloxane oligomers or polymers which are well known and commercially available. They exhibit, in their structure, at least two different units chosen from those of formula $R_3SiO_{1/2}$ (unit M), $R_2SiO_{2/2}$ (unit D), $RSiO_{3/2}$ (unit T) and $SiO_{4/2}$ (unit Q), at least one of these units being a unit T or Q. The radicals R are identical or different and are chosen from linear or branched $C_1$-$C_8$ alkyl, hydroxyl, aryl or alkylaryl radicals. Mention may be made, for example, as alkyl radicals, of the methyl, ethyl, isopropyl, tert-butyl and n-hexyl radicals. Mention may be made, as examples of branched organopolysiloxane oligomers or polymers, of MO resins, MDQ resins, TD resins and MDT resins, it being possible for hydroxyl functional groups to be carried by the units M, D and/or T.

The addition-curable liquid silicone compositions X of the invention may also contain at least one blowing agent J, and preferably said blowing agent J is a chemical blowing agent, and most preferably said blowing agent J is chosen from the group consisting of ammonium bicarbonate, ammonium hydrogen carbonate, alkali metal hydrogen carbonate and mixtures thereof. For the ease of application and production, the blowing agent J can be pre-dispersed in polydimethylsiloxane or in an organopolysiloxane A having at least two silicon-bonded $C_2$ to $C_{20}$ alkenyl groups per molecule, for example at a level from 30% to 60% by weight, with an eventual incorporation of any additive that could help to stabilize the shelf-life of the resulting composition. In another preferred embodiment, the blowing agent J may be chosen from the group consisting of ammonium bicarbonate, ammonium hydrogen carbonate, alkali metal hydrogen carbonate and mixtures thereof and wherein said blowing agent J has particles having a median particle size (D50) of ≤50 μm, and even more preferably ≤10 μm.

The addition-curable liquid silicone compositions X of the invention may also contain at least one additive I normally used in the field of the invention.

Rheology modifiers can optionally be added to improve rheological properties, to provide higher flow and smooth surfaces of the shaped articles. Such rheology modifiers can be PTFE-powders, boron oxide derivatives, flow additives like fatty acid fatty alcohol derivatives or derivative, esters and its salts or fluoroalkyl surfactants. Examples of rheology modifiers that may be used include, for example, epoxy functional silanes, poly(aryl)siloxane, polyalkylene glycol, polyester polyols, polyhydric alcohols, dicarboxylic acids, polyester diols, and silicone polyethers such as silicone-polyether block copolymer, free polyether, and mixtures thereof, such as, for example BLUESIL SP-3300 (Siloxanes and Silicones, di-Me, 3-hydroxypropyl Me, ethoxylated propoxylated; Elkem Silicones).

Examples of additives I that may be used include, but are not limited to, organic dyes or pigments, stabilizers introduced in silicone rubbers in order to improve heat stability, resistance against hot air, reversion, depolymerisation under attack of traces of acids or water at high temperature. Plasticizers, or release oils, or hydrophobicizing oils, such as polydimethylsiloxane oils, without reactive alkenyl or SiH groups. Mold-release such as fatty acid derivatives or fatty alcohol derivatives, fluoroalkyl. Compatibilizer such as hydroxylated silicone oils. Adhesion promoters and adhesion modifiers such organic silanes.

In some embodiments, the at least one additive I is an additive such as a colorant or a functional additive approved for use in the medical field such as, for example, Mevopur® or Remafin® concentrates (Clariant).

It is contemplated that a cured silicone elastomer obtained by curing an addition-curable liquid silicone composition X of the invention can be used in medical applications, such as in a long-term implantable/drug delivery device system. In such a system, the at least one additive I can be an active pharmaceutical ingredient, such as an active pharmaceutical ingredient having terminal alkene, alkyne, or carbonyl functionalities. Non-limiting examples of active pharmaceutical ingredients are hormones such as levonorgestrel, ethynyl estradiol, norethisterone, ethynodiol diacetate, desogestrel, lynestrenol, progesterone and mixtures thereof, synthetic hormones such as bimatoprost, corticosteroids such as dexamethasone, antiviral compounds such as pritelivir, microbicides, such as dapirivine, and any combination thereof.

The invention also relates to a cured silicone elastomer obtained by curing an addition-curable liquid silicone composition X as defined herein.

It has been advantageously demonstrated that cured silicone elastomers obtained by curing an addition-curable liquid silicone composition X of the invention display improved mechanical properties.

In some embodiments, the tensile strength of cured silicone elastomers obtained by curing an addition-curable liquid silicone composition X is increased compared to cured silicone elastomers in which an organosiloxane gum C is not present. For example, the tensile strength of cured silicone elastomers obtained by curing an addition-curable liquid silicone composition X may be at least 5% greater, at least 10% greater, at least 15% greater, or at least 20% greater than the tensile strength of a cured silicone elastomers in which an organosiloxane gum C is not present. In some embodiments, the tensile strength of cured silicone elastomers obtained by curing an addition-curable liquid silicone composition X is increased by at least 21% compared to the tensile strength of a cured silicone elastomers in which an organosiloxane gum C is not present.

In some embodiments, the elongation at break of cured silicone elastomers obtained by curing an addition-curable liquid silicone composition X is increased compared to cured silicone elastomers in which an organosiloxane gum C is not present. For example, the elongation at break of cured silicone elastomers obtained by curing an addition-curable liquid silicone composition X may be at least 5% greater, at least 10% greater, at least 15% greater, at least 20% greater, at least 25% greater, at least 30% greater, at least 35% greater, at least 40% greater, at least 45% greater, at least 50% greater, at least 55% greater, at least 60% greater, at least 65% greater, at least 70% greater, at least 75% greater, at least 80% greater, or at least 85% greater than the elongation at break of a cured silicone elastomers in which an organosiloxane gum C is not present. In some embodiments, the elongation at break of cured silicone elastomers obtained by curing an addition-curable liquid silicone composition X is increased by at least 87% compared to the elongation at break of a cured silicone elastomers in which an organosiloxane gum C is not present.

In some embodiments, the tear strength of cured silicone elastomers obtained by curing an addition-curable liquid silicone composition X is increased compared to cured silicone elastomers in which an organosiloxane gum C is not present. For example, the tear strength of cured silicone elastomers obtained by curing an addition-curable liquid silicone composition X may be at least 5% greater, at least 10% greater, at least 15% greater, at least 20% greater, at least 25% greater, at least 30% greater, at least 35% greater, at least 40% greater, at least 45% greater, at least 50% greater, at least 55% greater, at least 60% greater, at least 65% greater, at least 70% greater, or at least 75% greater than the tear strength of a cured silicone elastomers in which an organosiloxane gum C is not present. In some embodiments, the tear strength of cured silicone elastomers obtained by curing an addition-curable liquid silicone composition X is increased by at least 79% compared to the tear strength of a cured silicone elastomers in which an organosiloxane gum C is not present.

Use of the addition-curable liquid silicone composition X according to the invention with a 3D printer such as an extrusion 3D printer or a material jetting 3D printer is also provided herein.

In some embodiments, the addition-curable liquid silicone composition X according to the invention can be used in the field of medical materials and/or devices. For example, a cured product comprising the addition-curable liquid silicone composition X of the invention is also provided which may be suitable for use in a variety of drug delivery devices, implantable devices, medical tubes, stomach catheters, medical balloons, catheter balloons, artificial dialysis machines, blood dialysis machines, implant components, chemical stoppers, O-rings, tubing in peristaltic drug delivery pumps, check valves, resuscitator bulbs, and diaphragm and prosthesis suction cups for limb attachment.

Use of the cured silicone elastomers of the invention in an article and/or product, such as a medical device or electronic device described herein is also provided.

Other advantages provided by the present invention will become apparent from the following illustrative examples.

EXAMPLES

Materials and Methods

Preparation of the Silicone Compositions

In the Examples below, the following components were used:

A1: linear $\alpha,\omega$-vinyl polydimethylsiloxanes (average viscosity of 20000 mPa·s; Mn≈49,000 g/mol)

A2: linear $\alpha,\omega$-vinyl polydimethylsiloxanes (average viscosity of 4000 mPa·s; Mn≈31,000 g/mol)

A3: linear $\alpha,\omega$-vinyl polydimethylsiloxanes (average viscosity of 1000 mPa·s; Mn≈18,000 g/mol)

A4: linear $\alpha,\omega$-vinyl polydimethylsiloxanes (average viscosity of 200 mPa·s; Mn≈7,500 g/mol)

B1: trimethyl terminated (dimethylsiloxane-methylhydrogensiloxane)-dimethylsiloxane copolymer (viscosity of 18-26 mPa·s; 17-23% SiH by weight)

B2: MH$_4$Q silicone resin

PhGum1: diphenylsiloxane-dimethylsiloxane-vinylmethylsiloxane copolymer gum (total phenyl content of ≈12 mole %; total vinyl content of ≈0.072 weight %; viscosity of 63,578,000 mPa·s at 0.01 s-1; Mn≈180,000 g/mol); Consistency=540 (range 450-750)

PhGum2: vinyldimethyl terminated diphenylsiloxane-dimethylsiloxane copolymer gum (total phenyl content of ≈10 mole %; total vinyl content of ≈0.015 weight %; viscosity of ≈64,000,000 mPa·s; Mn≈180,000 g/mol); Consistency=range 450-750

PhGum3: vinyldimethyl terminated diphenylsiloxane-dimethylsiloxane copolymer gum (total phenyl content of ≈30 mole %; total vinyl content of ≈0.015 weight %; viscosity of ≈64,000,000 mPa·s; Mn≈180,000 g/mol) Consistency=range 450-750

PhGum4: diphenylsiloxane-dimethylsiloxane-vinylmethylsiloxane copolymer gum (total phenyl content of ≈12 mole %; total vinyl content of ≈0.036 weight %; viscosity of 59,700,000 mPa·s at 0.01 s-1; Mn≈180,000 g/mol); Consistency=672 (range 450-750)

PhOil: vinyldimethyl terminated diphenylsiloxane-dimethylsiloxane copolymer oil (total phenyl content of ≈39 mole %; total vinyl content of ≈0.70 weight %; viscosity of 800 mPa·s; Mn≈7,400 g/mol)

Gum1: vinyldimethyl terminated (vinylmethylsiloxane)-dimethylsiloxane copolymer gum (total vinyl content of 0.04-0.06 weight %; viscosity of >10,000,000 mPa·s; Mn≈220,000 g/mol) Consistency=648 (range 600-900)

Gum2: trimethyl terminated (vinylmethylsiloxane)-dimethylsiloxane copolymer gum (total vinyl content of 0.0675-0.0825 weight %; viscosity of 19,290,000 mPa·s at 0.01 s-1; Mn≈220,000 g/mol) Consistency=692 (range 600-900)

OHGum: hydroxy terminated polydimethylsiloxane gum (total hydroxy content≈0.01 weight %; viscosity of >10,000,000 mPa·s; Mn≈220,000 g/mol)

D1: platinum catalyst solution: platinum metal diluted in short linear $\alpha,\omega$-vinyl polydimethylsiloxane oils (weight % in platinum=3.38)

D2: platinum catalyst solution: platinum metal diluted in short linear $\alpha,\omega$-vinyl polydimethylsiloxane oils (weight % in platinum=10)

E1: In situ treated hydrophilic fumed silica (AEROSIL® 300 treated with hexamethyldisilazane)

E2: In situ treated hydrophilic fumed silica (AEROSIL® 300 treated with hexamethyldisilazane and divinyltetramethyldisilazane)

F: $\alpha,\omega$-hydride polydimethylsiloxanes (H-PDMS-H) (viscosity of 7-mPa·s; Mn≈750 g/mol)

G1: ECH (1-Ethynyl-1-cyclohexanol)

G2: tetramethyltetravinylcyclotetrasiloxane

Methods:

1) 3D Geometry and STL File

50% filled cube lattice of dimensions 20 mm×20 mm×20 mm. STL file was prepared and sliced by Cura 2.0 then saved on the SD card.

Printing parameters (unchanged throughout) are embedded within, i.e. speed, extrusion rate, layer height.

2) Printer and Dispenser

Ultimaker 2+3D Printer coupled with Discov3ry Paste Extruder from Structur3d 60 cc PE luer lock syringes with standard plunger from Genesis Instruments. Luer lock connections and 0.41 mm diameter conical nozzle, both from Nordson EFD.

3) 3D Printability Measurement

After curing, 3D printed silicone elastomers were visually inspected and characterized according to the following criteria:

"Excellent"—3D printed article maintains all structural integrity and high fidelity, with respect to the CAD file rendering, in both the uncured and the cured states.

"Good"—3D printed article maintains most structural integrity but may have lost some fidelity, with respect to the CAD file rendering, through slumping, collapse, or warpage in both uncured and the cured states.

"Fair"—3D printed article maintains some structural integrity but may have lost some fidelity, with respect to the CAD file rendering, through slumping, collapse, or warpage in both uncured and the cured states.

"Poor"—3D printed article maintains little to no structural integrity and little to no fidelity with respect to the CAD file rendering.

4) Rheology Behavior—Relaxation Time

Rheology measurements were conducted on Anton Paar, Sweep analysis Gap=0.300 mm, Temp=25.0° C., Applied shear rate=1 rads-1, Moving Profile=Viscoelastic Storage modulus is a measure of the energy stored in a material in which a deformation has been imposed ("applied shear rate").

The thixotropic behavior of the formulations was characterized through the determination of a recovery time or relaxation time. This was obtained from measurements of storage modulus growths over time after a pre-shear treatment. The purpose of this pre-shear treatment is to simulate the effect of the flow in the printer nozzle. The recovery time was then defined by the crossing point between the lines tangent to the initial and the final parts of the storage modulus curve.

5) Mechanical Properties

The following mechanical properties were evaluated: Durometer Shore A/Shore OO, tensile strength, elongation at break, tear strength, hardness, and modulus according to the method described in standard ASTM D412.

Example 1—Exemplary Compositions of the Invention

Silicone compositions as defined below in Table 1 were 3D printed at room temperature as described above and subsequently heated to 150° C. for 30 minutes. Rheology measurements were conducted separately as described above.

TABLE 1

| | Examples | | | | |
|---|---|---|---|---|---|
| | Comp. 1 | Ex. 1 | Comp. 2 | Comp. | Comp. |
| A1 | 43.69 | 43.69 | 43.69 | 43.69 | 43.69 |
| E1 | 23.29 | 23.29 | 23.29 | 23.29 | 23.29 |
| A3 | 28.65 | 9.48 | 9.48 | 9.48 | 9.48 |
| PhGum1 | 0 | 20 | 0 | 0 | 0 |
| Gum2 | 0 | 0 | 20 | 0 | 0 |
| Gum1 | 0 | 0 | 0 | 20 | 0 |
| OHGum | 0 | 0 | 0 | 0 | 20 |
| B1 | 0.07 | 0.05 | 0.05 | 0.05 | 0.05 |
| F | 2.54 | 1.73 | 1.73 | 1.73 | 1.73 |
| D1 | 0.0288 | 0.0288 | 0.0288 | 0.0288 | 0.0288 |
| dH2O | 1.73 | 1.73 | 1.73 | 1.73 | 1.73 |
| H/Vi molar ratio | 1.05 | 1.06 | 1.04 | 1.09 | 1.22 |
| Total mole % in | 0 | 2.4 | 0 | 0 | 0 |
| Relaxation time (s) | Not | 60 | 300 | 300 | 300 |
| 3D Printability | Poor | Excellent | | Poor | |
| Curing ability (30 min at 150° C.) | Curable | Curable | | Curable | |

As illustrated in Table 1 and in FIG. 1, introduction of phenyl-containing gum (PhGum1) greatly improved the 3D printability of the liquid silicone composition while maintaining the ability of the liquid silicone composition to cure under heat. The presence of phenyl groups on the backbone induces a thixotropic behavior as demonstrated by rapid relaxation time (Table 1).

Figure 2:
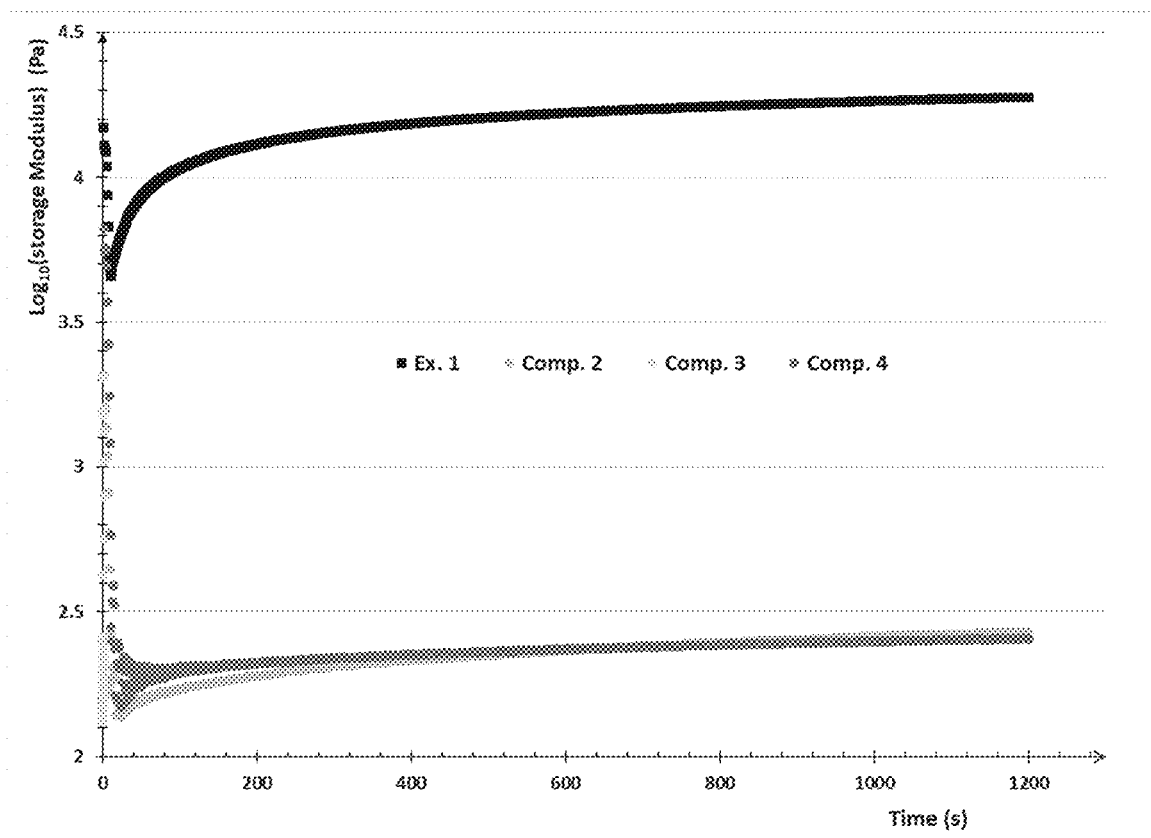
FIG. 2 shows a graph displaying the rheological properties of addition-curable liquid silicone compositions containing various organopolysiloxane gums.

Replacement of the phenyl-containing gum with gums containing other functions, such as hydroxyl (OHGum) or vinyl functions (Gum1 & Gum2) did not produce the same thixotropic effect as illustrated by comparative examples Comp. 2-4 above in Table 1 and in FIG. 2.

Figure 1B:
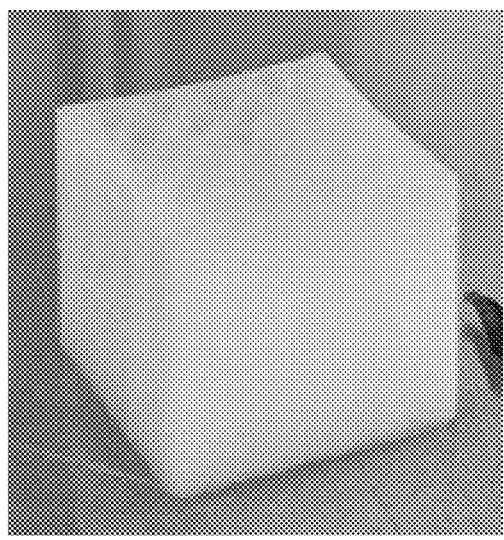
Figure 1C:
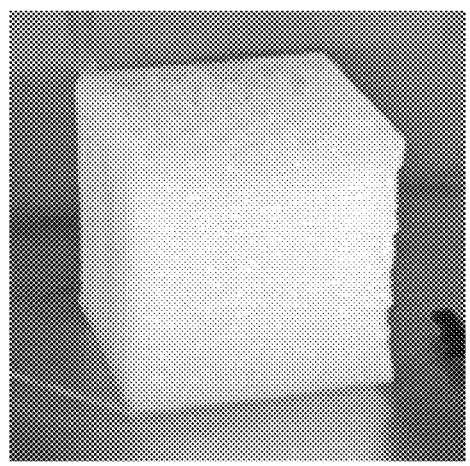
Figure 1D:
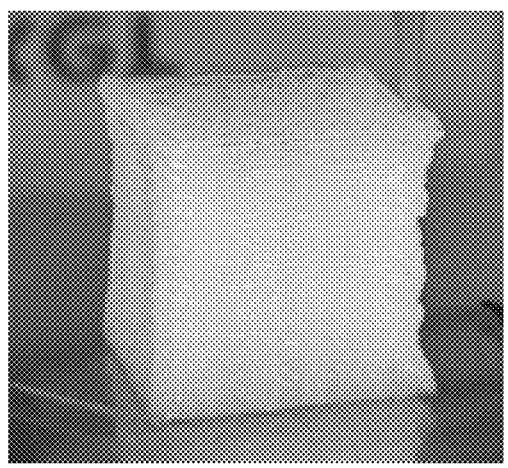
Figure 1E:
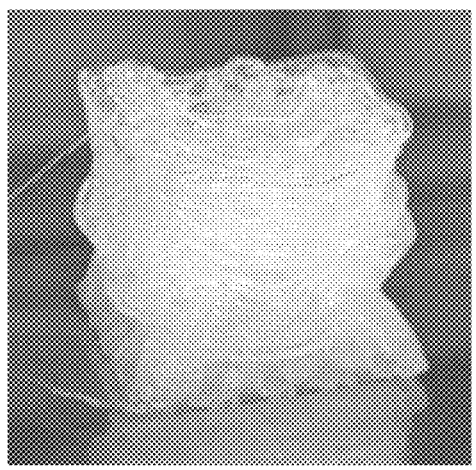
Figure 1F:
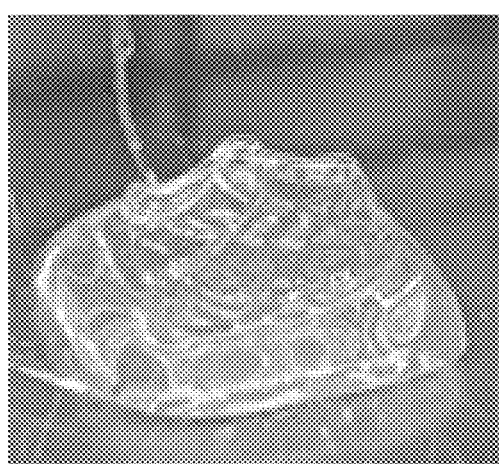

Representative photographs of 3D printed compositions are provided in FIG. 1 for comparative example 1 (Comp 1, no gum, FIG. 1A), exemplary composition 1 (Ex. 1, phenyl-gum (PhGum1), FIG. 1B), and comparative composition 2 (Comp 2, vinyl gum (Gum2), FIG. 1E). Only Ex. 1 (FIG. 1B) retained its shape without collapsing.

Example 2—Effect of Varying Amount of Phenyl-Containing Gum

Low durometer silicone compositions with different quantities of PhGum1 were formulated and evaluated. To end up at 100%, Gum2 was added to make up for the decrease in PhGum1.

Figure 3:
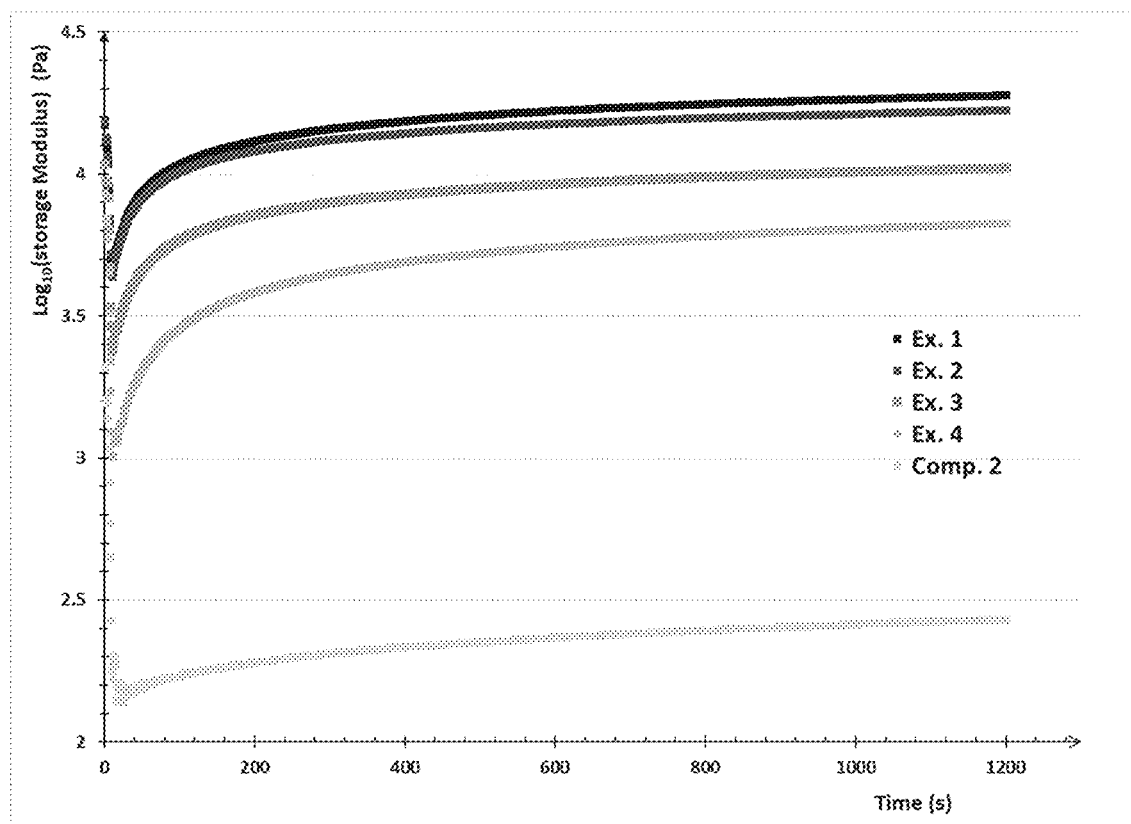
FIG. 3 shows a graph displaying the rheological properties of addition-curable liquid silicone compositions containing varying concentrations of aryl-containing organopolysiloxane gum.

Silicone compositions as defined below in Table 2 were 3D printed at room temperature as described above and subsequently heated to 150° C. for 30 minutes. Rheology measurements were conducted separately as described above. Mechanical properties were measured as described above after curing at 150° C. for 30 minutes, followed by 115° C. for 30 minutes. Results are shown in Table 2. Thixotropic properties are illustrated in FIG. 3.

TABLE 2

| | Examples | | | | |
|---|---|---|---|---|---|
| | Ex. 1 | Ex. 2 | Ex. 3 | Ex. 4 | Comp. 2 |
| A1 | 43.69 | 43.69 | 43.69 | 43.69 | 43.69 |
| E1 | 23.29 | 23.29 | 23.29 | 23.29 | 23.29 |
| A3 | 9.48 | 9.48 | 9.48 | 9.48 | 9.48 |
| PhGum1 | 20 | 15 | 10 | 5 | 0 |
| Gum2 | 0 | 5 | 10 | 15 | 20 |
| B1 | 0.05 | 0.05 | 0.05 | 0.05 | 0.05 |
| F | 1.73 | 1.73 | 1.73 | 1.73 | 1.73 |
| D1 | 0.0288 | 0.0288 | 0.0288 | 0.0288 | 0.0288 |
| dH2O | 1.72 | 1.72 | 1.72 | 1.72 | 1.72 |
| H/Vi molar ratio | 1.06 | 1.06 | 1.05 | 1.05 | 1.04 |
| Total mole % in | 2.4 | 1.8 | 1.2 | 0.6 | 0 |
| Relaxation time (s) | 60 | 65 | 80 | 105 | 300 |
| 3D Printability | Excellent | Good | Fair | Poor | Poor |
| Curing ability* | Curable | Curable | Curable | Curable | Curable |
| Mechanical Properties** | | | | | |
| Durometer (Shore A) | 2 | 6 | 7 | 10 | 7 |
| Tensile Stress (psi) | 193 | 203 | 297 | 334 | 363 |
| Elongation (%) | 915 | 978 | 981 | 986 | 989 |

*Curing conditions: 30 min at 150° C.
**Curing conditions: 30 min at 150° C. followed by post-curing for 30 min at 115° C.

As illustrated in Table 2, in FIG. 1, and in FIG. 3, the 3D printability and thixotropic behavior of the liquid silicone compositions deteriorated with decreasing percentages of phenyl-containing gum within the compositions. In particular, FIG. 1B shows a representative photograph of 3D printed compositions of Ex. 1, FIG. 1C shows a representative photograph of 3D printed compositions of Ex. 2, FIG. 1D shows a representative photograph of 3D printed compositions of Ex. 3, FIG. 1E shows a representative photograph of 3D printed compositions of Ex. 4, and FIG. 1F shows a representative photograph of 3D printed compositions of Comp. 2.

Example 3—Effect of Different Phenyl-Containing Gums and Oils

Silicone compositions as defined below in Table 3 were 3D printed at room temperature as described above and subsequently heated to 150° C. for 30 minutes. Rheology measurements were conducted separately as described above.

TABLE 3

|  | Examples | | | | |
| --- | --- | --- | --- | --- | --- |
|  | Ex. 1 | Comp. | Ex. 6 | Ex. 7 | Ex. 5 |
| A1 | 43.69 | 43.69 | 43.69 | 43.69 | 41.78 |
| E1 | 23.29 | 23.29 | 23.29 | 23.29 | 22.28 |
| A3 | 9.48 | 9.48 | 9.48 | 9.48 | 8.48 |
| PhGum2 | 0 | 0 | 0 | 0 | 24 |
| PhGum1 | 20 | 0 | 0 | 0 | 0 |
| PhGum3 | 0 | 0 | 8 | 20 | 0 |
| PhOil | 0 | 6.16 | 0 | 0 | 0 |
| Gum2 | 0 | 13.84 | 12 | 0 | 0 |
| B1 | 0.05 | 0.05 | 0.05 | 0.05 | 0.05 |
| F | 1.73 | 1.73 | 1.73 | 1.73 | 1.73 |
| D1 | 0.0288 | 0.0288 | 0.0288 | 0.0288 | 0.0288 |
| dH2O | 1.72 | 1.72 | 1.72 | 1.72 | 1.65 |
| H/V molar ratio | 1.05 | 0.74 | 1.09 | 1.18 | 1.25 |
| Total mole % in | 2.4 | 2.4 | 2.4 | 6.0 | 2.4 |
| Relaxation time (s) | 60 | 95 | 215 | 110 | 55 |

Figure 4:
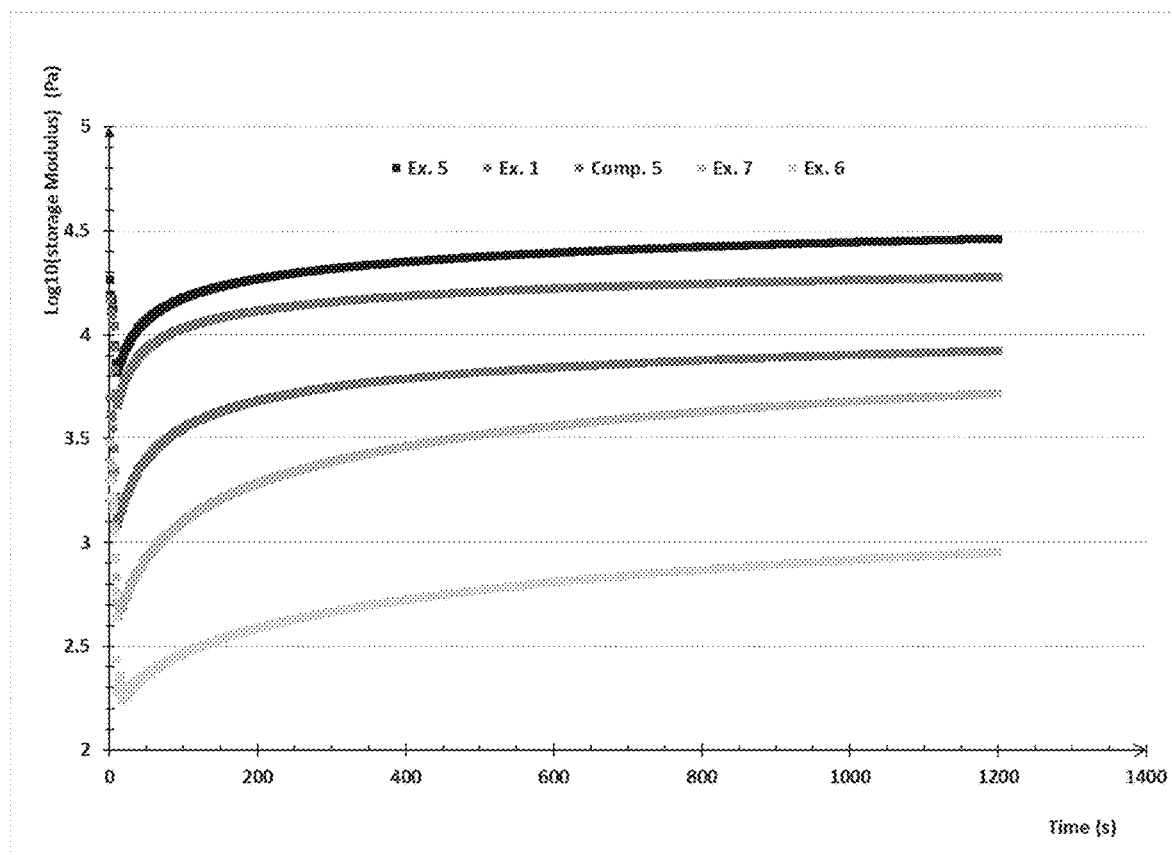
FIG. 4 shows a graph displaying the rheological properties of addition-curable liquid silicone compositions containing various types of aryl-containing organopolysiloxanes.

As illustrated in Table 3 and FIG. 4, liquid silicone compositions comprising organosiloxanes with lower phenyl content (less than 30 mole %) performed better than liquid silicone compositions comprising organosiloxanes with higher phenyl content (30 mole % or greater) despite the total mole % of phenyl within the composition being maintained at 2.4%. Specifically, Ex. 1 and Ex. 5 each comprise gums with a phenyl content of either 12 moles % (PhGum1) or 10 moles % (PhGum2) and display favorable relaxation time and Log$_{10}$ (storage modulus). In contrast, Ex. 6, comprising a gum with 30 mole % phenyl content (PhGum3), displayed longer relaxation time and lower Log$_{10}$ (storage modulus) despite the total mole % in phenyl in the composition being maintained at 2.4%. This does not appear to be due to change in viscosity since the total gum % was maintained at 20% in by addition of Gum2 (vinylgum). Increasing the amount of PhGum3 to 20% (Ex. 7) improved results, suggesting that both the amount of phenyl-gum within the composition and the phenyl content of the gum are important for the overall properties of the compositions.

Use of a phenyl-containing organosiloxane oil with higher phenyl content (Comp. 5) also resulted in longer relaxation time and lower Log$_{10}$ (storage modulus).

Example 4—High Durometer Silicone Elastomers

Silicone compositions as defined below in Table 4 were 3D printed at room temperature as described above and subsequently heated to 150° C. for 30 minutes. Rheology measurements were conducted separately as described above. Mechanical properties were measured as described above after curing at 150° C. for 30 minutes, followed by additional curing at 115° C. for 30 minutes.

TABLE 4

|  | Examples | | |
| --- | --- | --- | --- |
|  | Comp. 6 | Ex. 8 | Ex. 9 |
| A1 | 27.16 | 27.16 | 27.16 |
| A2 | 20.84 | 20.84 | 20.84 |
| E2 | 27.34 | 27.34 | 27.34 |
| A4 | 10.35 | 10.35 | 10.35 |
| D2 | 0.02 | 0.02 | 0.02 |
| B2 | 6 | 5.57 | 6.31 |
| G2 | 1.3 | 1.17 | 1.30 |
| PhOil3 | 1.93 | 0 | 0 |
| PhGum1 | 0 | 2.5 | 6.25 |
| G1 | 0.4 | 0.4 | 0.4 |
| dH2O | 4.67 | 4.67 | 4.67 |
| H/Vi molar ratio | 1.95 | 1.95 | 1.95 |
| Mole % in phenyl | 1.5 | 0.60 | 1.5 |
| 3D Printability | Fair | Fair | Excellent |
| Curing ability (30 min 150° C.) | Curable | Curable | Curable |
| Mechanical Properties | | | |
| Hardness (DSA) | 70 | 65 | 66 |
| Tensile Strength | 1064 | 1330 | 1294 |
| Elongation at Break | 132 | 271 | 247 |
| Tear Strength (ppi) | 43 | 82 | 77 |

Figure 5A:
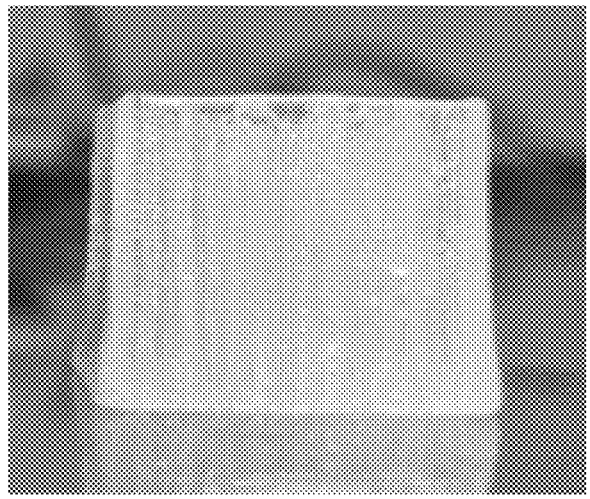
FIGS. 5A-5C provide representative photographs of 3D printed silicone elastomers.
Figure 5B:
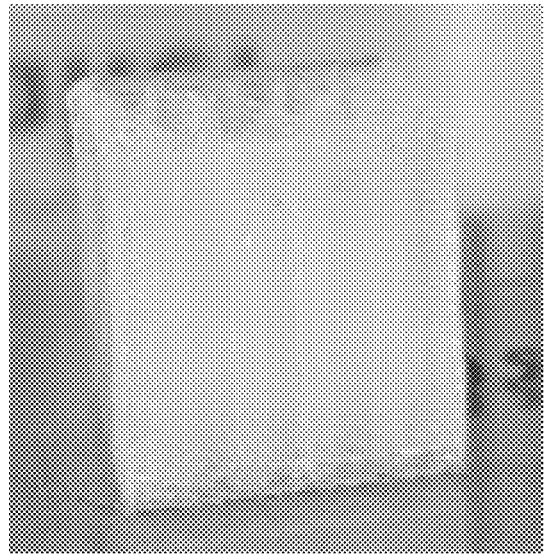
Figure 5C:
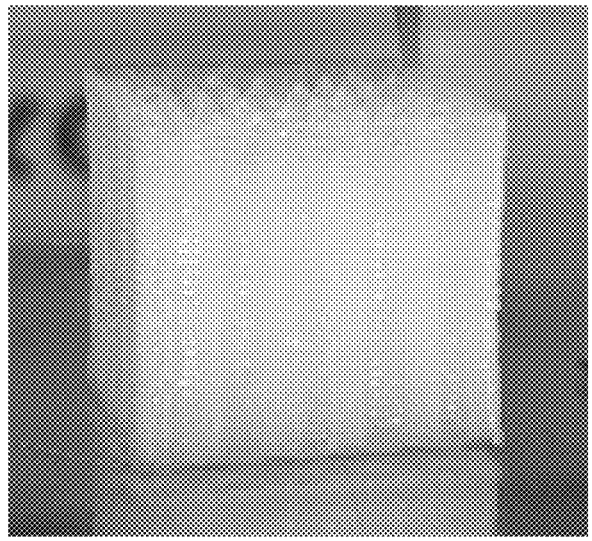

As illustrated in Table 4 and in FIG. 5, use of a phenyl-containing organosiloxane gum (PhGum1) in place of a phenyl-containing organosiloxane oil (PhOil3) results in better 3D printability of the resulting liquid silicone compositions. FIG. 5A shows a representative photograph of 3D printed compositions of Comp. 6, FIG. 5B shows a representative photograph of 3D printed compositions of Ex. 8, and FIG. 5C shows a representative photograph of 3D printed compositions of Ex. 9. Ex. 8 exhibited some internal collapsing that isn't apparent from FIG. 5B and thus, is characterized in Table 4 as having "fair" 3D printability.

Additionally, cured silicone elastomers comprising phenyl-containing organosiloxane gum displayed better mechanical properties (e.g., greater tensile strength, elongation at break, and tear strength) compared to cured silicone elastomers comprising phenyl-containing organosiloxane oil. In particular, tensile strength was increased by at least 21%, elongation at break was increased by at least 87%, and tear strength was increased by at least 79% in cured silicone elastomers comprising phenyl-containing organosiloxane gum of the invention compared to cured silicone elastomers comprising phenyl-containing organosiloxane oil.

Example 5—Comparison of Thixotropic Properties of PhGum1 and Gum2

As illustrated in the above examples, both low durometer and high durometer silicone compositions including phenyl-containing gums outperformed silicone compositions including similar gums without phenyl groups. Thus, three of the gums used in the above Examples (PhGum1, Gum1, and Gum2) were compared to determine if their thixotropic properties could contribute to this effect. An additional phenyl gum with similar properties to PhGum1 was also studied (PhGum4; vinyldimethyl terminated diphenylsiloxane-dimethylsiloxane copolymer gum (total phenyl content of ≈30 mole %; total vinyl content of ≈0.036 weight %; viscosity of ≈64,000,000 mPa·s; Mn≈180,000 g/mol)).

Consistency was measured is at 25° C. by a PNR 12 or equivalent model penetrometer capable of applying a cylindrical head to the sample under standardized conditions. The hardness of the gum is represented by a value 10 times the depth (mm) that the cylindrical body with memory penetrates into the sample over 1 minute. To do this, a gum sample is placed in an aluminum container having a diameter of 40 mm and a height of 60 mm. A bronze or brass cylindrical head having a diameter of 6.35 mm and a height of 4.76 mm is attached to a metal rod having a length of 51 mm and a diameter of 3 mm suitable for a penetration meter. A 100 g load weight is attached to this bar. The total weight of the assembly is 151.8 g. Place the gum sample container in a bath set at 25° C.±0.5° C. for a minimum of 30 seconds. Perform the measurement according to the manufacturer's instructions.

The viscosity of the gums was measured using an Anton Paar type Rheometer, or equivalent with zero gap set between the 2 plateaus of 0.300 mm and a shear rate range of between 0.01 s-1 and 100 s-1 at 25.0° C.

Figure 6A:
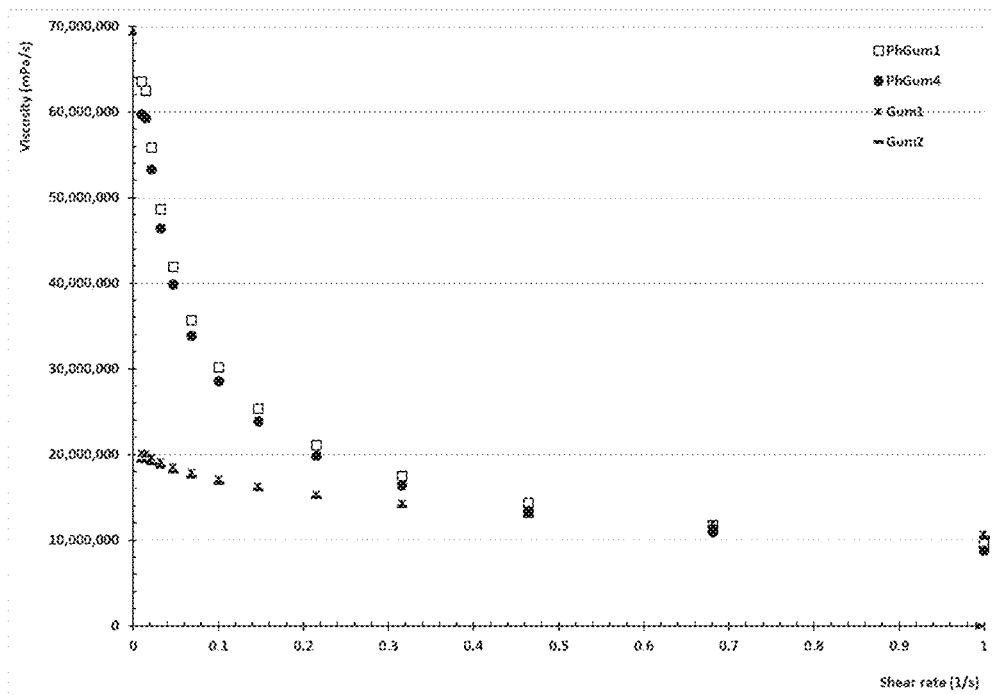
FIGS. 6A & 6B show graphs displaying thixotropic properties of organopolysiloxane gums on both a linear (FIG. 6A) and logarithmic (FIG. 6S) scale.
Figure 6B:
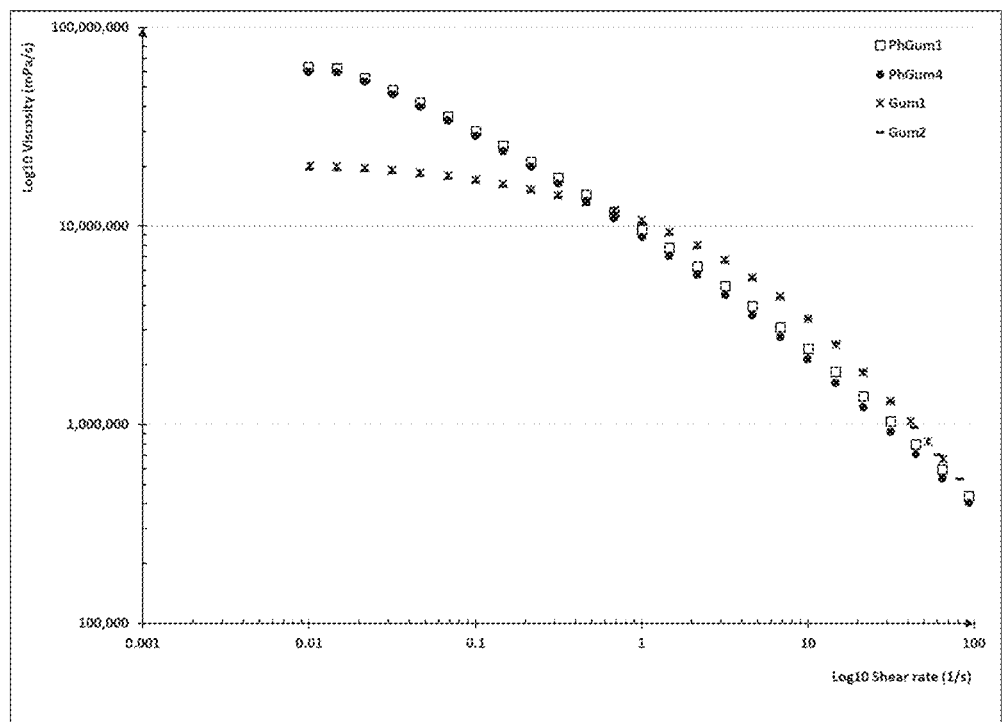

Table 5 provides the viscosity and consistency values for each of these gums. FIG. 6 provides the thixotropic properties on both a linear (FIG. 6A) and logarithmic (FIG. 6B) scale. Both phenyl gums (PhGum1 and PhGum4) were more viscous than the vinyl gums (Gum1 and Gum 2) at low shear rates (e.g., 0.01 s-1). However, at higher shear rates (e.g., 0.3 s-1 or greater), the viscosity of all four gums were similar.

TABLE 5

|  | Viscosity measured at 0.01 s-1 | Consistency |
| --- | --- | --- |
| PhGum1 | 63,578,000 mPa · s | 540 (range 450-750) |
| PhGum4 | 59,700,000 mPa · s | 672 (range 450-750) |
| Gum1 | 20,100,999 mPa · s | 648 (range 600-900) |
| Gum2 | 19,290,000 mPa · s | 692 (range 600-900) |

Example 6—Effect of Filler

A series of samples involving phenyl gum (PhGum1), filler (HMDZ-treated silica (E1)), and linear α,ω-vinyl polydimethylsiloxanes (average viscosity of 60000; PDMS fluid) were made at four combinations (no phenyl gum/no filler, no phenyl gum/filler, phenyl gum/no filler, phenyl gum/filler). Phenyl gum was added at 20% and filler at 1%. The purpose was to isolate where the thixotropic effect came from and not simply the increase in viscosity. It was found that all four samples had a significant increase in the viscosity but did not exhibit thixotropic properties. The filler content at 1% by weight was insufficient. A further sample of 50% phenyl gum and 50% PDMS fluid was made and again viscosity increased but not the thixotropic properties. Given that a typical combination of PDMS fluid with concentrated filler (>25%) does not exhibit thixotropic properties either, it can be said that these factors alone will not make a composition 3D-printable, but some synergetic effect between the phenyl content of the gum and the filler together is necessary.

All references cited in this specification are herein incorporated by reference as though each reference was specifically and individually indicated to be incorporated by reference. The citation of any reference is for its disclosure prior to the filing date and should not be construed as an admission that the present disclosure is not entitled to antedate such reference by virtue of prior invention.

It will be understood that each of the elements described above, or two or more together may also find a useful application in other types of methods differing from the type described above. Without further analysis, the foregoing will so fully reveal the gist of the present disclosure that others can, by applying current knowledge, readily adapt it for various applications without omitting features that, from the standpoint of prior art, fairly constitute essential characteristics of the generic or specific aspects of this disclosure set forth in the appended claims. The foregoing embodiments are presented by way of example only; the scope of the present disclosure is to be limited only by the following claims.

The invention claimed is:

1. An addition-curable liquid silicone composition X for additive manufacturing a silicone elastomer article, wherein said addition-curable liquid silicone composition X comprises:
    (A) at least one organopolysiloxane A having at least two silicon-bonded $C_2$ to $C_{20}$ alkenyl groups per molecule,
    (B) at least one organosilicon crosslinker B containing at least two silicon-bonded hydrogen atoms per molecule,
    (C) at least one organopolysiloxane gum C having a consistency of between 200 and 900 at 25° C. and containing at least one silicon-bonded $C_2$ to $C_{20}$ alkenyl group per molecule and at least one silicon-bonded $C_6$ to $C_{12}$ aryl groups per molecule,
    (D) at least one addition reaction catalyst D,
    (E) at least one filler E,
    (F) optionally, at least one diorganohydrogensiloxy-terminated diorganopolysiloxane chain extender F,
    (G) optionally, at least one cure rate modifier G,
    (H) optionally, at least one silicone resin H, and
    (I) optionally, at least one additive I.

2. The addition-curable liquid silicone composition X according to claim 1, wherein said at least one organopolysiloxane A having at least two silicon-bonded $C_2$ to $C_{20}$ alkenyl groups per molecule is of the following formula (1):

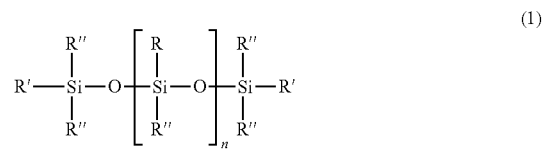

wherein:
    n is an integer ranging from 1 to 1000,
    R is independently selected from a $C_1$ to $C_{20}$ alkyl group a $C_6$ to $C_{12}$ aryl group or a $C_2$ to $C_{20}$ alkenyl group,
    R' is independently selected from a $C_2$ to $C_{20}$ alkenyl group, and
    R" is independently selected from a $C_1$ to $C_{20}$ alkyl group or a $C_6$ to $C_{12}$ aryl group.

3. The addition-curable liquid silicone composition X according to claim 1, wherein said at least one organopolysiloxane A having at least two silicon-bonded $C_2$ to $C_{20}$ alkenyl groups per molecule is of the following formula (1):

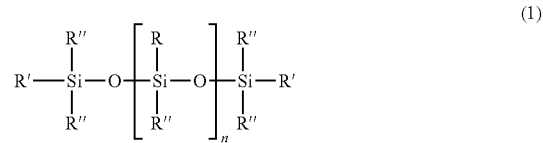

wherein:
n is an integer ranging from 1 to 1000,
R is a methyl group,
R' is a vinyl group, and
R" is a methyl group.

4. The addition-curable liquid silicone composition X according to claim 1, wherein the at least one organosilicon crosslinker B containing at least two silicon-bonded hydrogen atoms per molecule comprises:
(i) at least two siloxy units of formula (XL-1) which may be identical or different:

$$(H)(Z)_e SiO_{(3-e)/2} \qquad (XL-1)$$

wherein:
the symbol H represents a hydrogen atom,
the symbol Z represents an alkyl having from 1 to 8 carbon atoms, and
the symbol e is equal to 0, 1 or 2; and
(ii) at least one, and optionally from 1 to 550 of siloxy unit(s) of formula (XL-2):

$$(Z)_q SiO_{(4-g)/2} \qquad (XL-2)$$

wherein:
the symbol Z represents an alkyl having from 1 to 8 carbon atoms, or a $C_6$-$C_{12}$ aryl group, and
the symbol g is equal to 0, 1, 2 or 3;
wherein Z in XL-1 and XL-2 can be the same or different.

5. The addition-curable liquid silicone composition X according to claim 4, wherein the at least one organosilicon crosslinker B comprises from 3 to 60 siloxy units of formula (XL-1) and from 1 to 250 siloxy unit(s) of formula (XL-2).

6. The addition-curable liquid silicone composition X according to claim 1, wherein the at least one organopolysiloxane gum C containing at least one silicon-bonded $C_2$ to $C_{20}$ alkenyl groups per molecule and at least one silicon-bonded $C_6$ to $C_{12}$ aryl groups per molecule comprises:
at least one siloxy unit of formula (A-3):

$$(Alk)(R)_h SiO_{(3-h)/2} \qquad (A-3)$$

wherein the symbol "Alk" represents a $C_2$ to $C_{20}$ alkenyl group, and the symbol R represents a $C_1$ to $C_{20}$ alkyl group, or a $C_6$-$C_{12}$ aryl group in which each instance of "Alk" and R can be the same or different, and
wherein h=1 or 2, and
at least one siloxy unit of formula (A-4):

$$(Ar)_k(R')_h SiO_{(4-h-k)/2} \qquad (A-4)$$

wherein the symbol "Ar" represents a $C_6$-$C_{12}$ aryl group optionally substituted by a $C_2$-$C_{20}$ alkylene group, or a $C_1$-$C_{20}$ aralkyl optionally substituted by a $C_2$-$C_{20}$ alkylene group, or a naphthyl group optionally substituted by a $C_1$-$C_{20}$ alkyl group and/or a $C_2$-$C_{20}$ alkylene group, or an anthracenyl group optionally substituted by a $C_1$-$C_{20}$ alkyl group and/or a $C_2$-$C_{20}$ alkylene group, and the symbol $R^1$ represents a $C_1$ to $C_{20}$ alkyl group, or a $C_2$ to $C_{20}$ alkenyl group, in which each instance of "Ar" and $R^1$ can be the same or different, and
wherein h=0, 1, or 2,
wherein k=1 or 2, and wherein h+k=1, 2, or 3;
other siloxy units of formula (A-2):

$$(L)_g SiO_{(4-g)/2} \qquad (A-2)$$

in which the symbol L represents a $C_1$ to $C_{20}$ alkyl group, and the symbol g is equal to 0, 1, 2, or 3, in which each instance of L can be the same or different.

7. The addition-curable liquid silicone composition X according to claim 1, wherein at least one organopolysiloxane gum C containing at least one silicon-bonded $C_2$ to $C_2$ alkenyl groups per molecule and at least one silicon-bonded $C_6$ to $C_{12}$ aryl groups per molecule comprises:
at least one siloxy unit of formula (A-3):

$$(Alk)(R)_h SiO_{(3-h)/2} \qquad (A-3)$$

wherein the symbol "Alk" represents a vinyl group, and the symbol R represents a $C_1$ to $C_{20}$ alkyl group, or a $C_6$-$C_{12}$ aryl group in which each instance of "Alk" and R can be the same or different, and
wherein h=1 or 2, and
at least one siloxy unit of formula (A-4):

$$(Ar)_k(R^1)_h SiO_{(4-h-k)2} \qquad (A-4)$$

wherein the symbol "Ar" represents a phenyl group, and the symbol $R^1$ represents a $C_1$ to $C_{20}$ alkyl group, or a $C_2$ to $C_{20}$ alkenyl group, in which each instance of "Ar" and $R^1$ can be the same or different, and
wherein h=0 or 1,
wherein k=2, and
other siloxy units of formula (A-2):

$$(L)_g SiO_{(4-g)/2} \qquad (A-2)$$

in which the symbol L represents a $C_1$ to $C_{20}$ alkyl group, and the symbol g is equal to 0, 1, 2, or 3, in which each instance of L can be the same or different.

8. The addition-curable liquid silicone composition X according to claim 1, wherein the at least one organopolysiloxane gum C containing at least one silicon-bonded $C_2$ to $C_{20}$ alkenyl groups per molecule and at least one silicon-bonded $C_6$ to $C_{12}$ aryl groups per molecule is a diphenylsiloxane-dimethylsiloxane-vinylmethylsiloxane copolymer gum.

9. The addition-curable liquid silicone composition X according to claim 1, wherein the at least one organopolysiloxane gum C containing at least one silicon-bonded $C_2$ to $C_{20}$ alkenyl groups per molecule and at least one silicon-bonded $C_6$ to $C_{12}$ aryl groups per molecule is vinyl-terminated.

10. The addition-curable liquid silicone composition X according to claim 1, wherein the at least one organopolysiloxane gum C containing at least one silicon-bonded $C_2$ to $C_{20}$ alkenyl groups per molecule and at least one silicon-bonded $C_6$ to $C_{12}$ aryl groups per molecule comprises less than 30 mole % of aryl groups.

11. The addition-curable liquid silicone composition X according to claim 1, wherein the at least one organopolysiloxane gum C containing at least one silicon-bonded $C_2$ to $C_{20}$ alkenyl groups per molecule and at least one silicon-bonded $C_6$ to $C_{12}$ aryl groups per molecule comprises from about 10 mole % to about 20 mole % of aryl groups.

12. The addition-curable liquid silicone composition X according to claim 1, wherein the catalyst D is a platinum group metal-containing catalyst.

13. The addition-curable liquid silicone composition X according to claim 1, wherein the at least one filler E is fumed silica treated using at least one compatibilization agent in the presence of at least one portion of the at least one alkenyl group-containing organopolysiloxane A.

14. The addition-curable liquid silicone composition X according to claim 1 for use with a 3D printer.

15. The addition-curable liquid silicone composition X according to claim 14, wherein the 3D printer is selected from an extrusion 3D printer or a material jetting 3D printer.

16. The addition-curable liquid silicone composition X according to claim 2, wherein R is a $C_1$-$C_{20}$ alkyl group selected from the group consisting of a methyl, ethyl, and propyl group; a $C_6$ to $C_{12}$ aryl group selected from the group consisting of a xylyl, tolyl, and phenyl group; or a $C_2$ to $C_{20}$ alkenyl selected from the group consisting of a vinyl, allyl, hexenyl, decenyl, and tetradecenyl group;

R' is a $C_2$ to $C_{20}$ alkenyl group selected from the group consisting of a vinyl, allyl, hexenyl, decenyl, and tetradecenyl group; and R" is a $C_1$-$C_{20}$ alkyl group selected from the group consisting of a methyl, ethyl, and propyl group; or a $C_6$ to $C_{12}$ aryl group selected from the group consisting of a xylyl, tolyl, and phenyl group.

17. The addition-curable liquid silicone composition X according to claim 4, wherein the $C_6$-$C_{12}$ aryl group is selected from the group consisting of a xylyl, tolyl, and phenyl group.

18. The addition-curable liquid silicone composition X according to claim 6, wherein "Alk" represents a $C_2$ to $C_{20}$ alkenyl group selected from the group consisting of a vinyl, allyl, hexenyl, decenyl, and tetradecenyl group;

the symbol R represents a $C_1$ to $C_{20}$ alkyl group selected from the group consisting of a methyl, ethyl, and propyl group, or or a $C_6$-$C_{12}$ aryl group selected from the group consisting of a xylyl, tolyl, and phenyl group;

the symbol "Ar" represents a $C_6$-$C_{12}$ aryl group optionally substituted by a $C_2$-$C_{20}$ alkylene group selected from the grup consisting of a xylyl, tolyl, xylene, and phenyl group;

the symbol $R^1$ represents a $C_1$ to $C_{20}$ alkyl group selected from the group consisting of a methyl, ethyl, and propyl group, or a a $C_2$ to $_{20}$ alkenyl group selected from the group consisting of a vinyl, allyl, hexenyl, decenyl, and tetradecenyl group; and the symbol "L" represents a $C_1$ to $C_{20}$ alkyl group selected from the group consisting of a methyl, ethyl, and propyl group.

19. The addition-curable liquid silicone composition X according to claim 7, wherein the symbol R represents a $C_1$ to $C_{20}$ alkyl group selected from the group consisting of methyl, ethyl, and propyl group, or a $C_6$-$C_{12}$ aryl group selected from the group consisting of xylyl, tolyl, and phenyl group;

and the symbol $R^1$ represents a $C_1$ to $C_{20}$ alkyl group selected from the group consisting of a methyl, ethyl, and propyl group, or a $C_2$ to $C_{20}$ alkenyl group selected from the group consisting of a vinyl, allyl, hexenyl, decenyl, and tetradecenyl group; and the symbol L represents a $C_1$ to $C_{20}$ alkyl group selected from the group consisting of a methyl, ethyl, and propyl group.

* * * * *